(12) United States Patent
Fairweather

(10) Patent No.: US 7,308,449 B2
(45) Date of Patent: Dec. 11, 2007

(54) SYSTEM AND METHOD FOR MANAGING COLLECTIONS OF DATA ON A NETWORK

(76) Inventor: John Fairweather, 1649 Wellesley Dr., Santa Monica, CA (US) 90405

( * ) Notice: Subject to any disclaimer, the term of this patent is extended or adjusted under 35 U.S.C. 154(b) by 553 days.

(21) Appl. No.: 10/357,304

(22) Filed: Feb. 3, 2003

(65) Prior Publication Data

US 2003/0187854 A1   Oct. 2, 2003

Related U.S. Application Data

(60) Provisional application No. 60/353,487, filed on Feb. 1, 2002.

(51) Int. Cl.
*G06F 17/30* (2006.01)
(52) U.S. Cl. ............................................. 707/10
(58) Field of Classification Search ................ 707/10, 707/103 R, 104.1, 201; 709/201, 203; 719/315
See application file for complete search history.

(56) References Cited

U.S. PATENT DOCUMENTS

| | | | | |
|---|---|---|---|---|
| 5,819,083 | A * | 10/1998 | Chen et al. | 707/10 |
| 6,237,005 | B1 * | 5/2001 | Griffin | 707/102 |
| 6,453,321 | B1 * | 9/2002 | Hill et al. | 707/103 Y |
| 6,507,833 | B1 * | 1/2003 | Hichwa et al. | 707/1 |
| 6,704,737 | B1 * | 3/2004 | Nixon et al. | 707/101 |
| 6,826,744 | B1 * | 11/2004 | McAuley | 717/108 |
| 6,862,610 | B2 * | 3/2005 | Shuster | 709/217 |

\* cited by examiner

*Primary Examiner*—Apu Mofiz
*Assistant Examiner*—Kavita Padmanabhan
(74) *Attorney, Agent, or Firm*—Merchant & Gould P.C.; Stanley J. Gradisar

(57) ABSTRACT

The present invention enables the creation, management, retrieval, distribution and massively large collections of information that can be shared across a distributed network without building absolute references or even pre-existing knowledge of the data and data structures being stored in such an environment. The system includes the following components: (1) a 'flat' data model wherein arbitrarily complex structures can be instantiated within a single memory allocation (including both the aggregation arrangements and the data itself, as well as any cross references between them via 'relative' references); (2) a run-time type system capable of defining and accessing binary strongly-typed data; (3) a set of 'containers' within which information encoded according to the system can be physically stored and preferably include a memory resident form, a file-based form, and a server-based form; (4) a client-server environment that is tied to the types system and capable of interpreting and executing all necessary collection manipulations remotely; (5) a basic aggregation structure providing as a minimum a 'parent', 'nextChild', 'previousChild', 'firstChild', and 'lastChild' links or equivalents; and (6) a data attachment structure (whose size may vary) to which strongly typed data can be attached and which is associated in some manner with (and possibly identical to) a containing aggregation node in the collection. Additional extensions and modifications to the system are also specified herein.

35 Claims, 6 Drawing Sheets

[FIGURE 1]
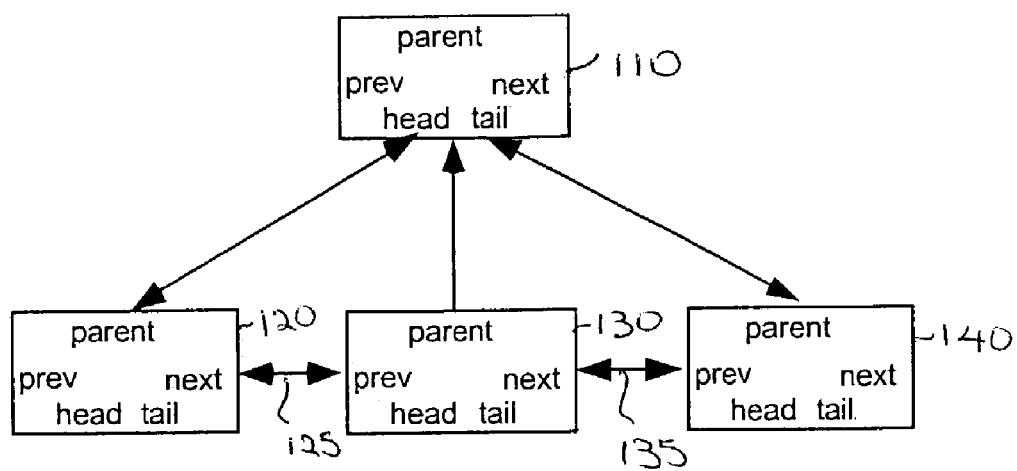

[FIGURE 2]
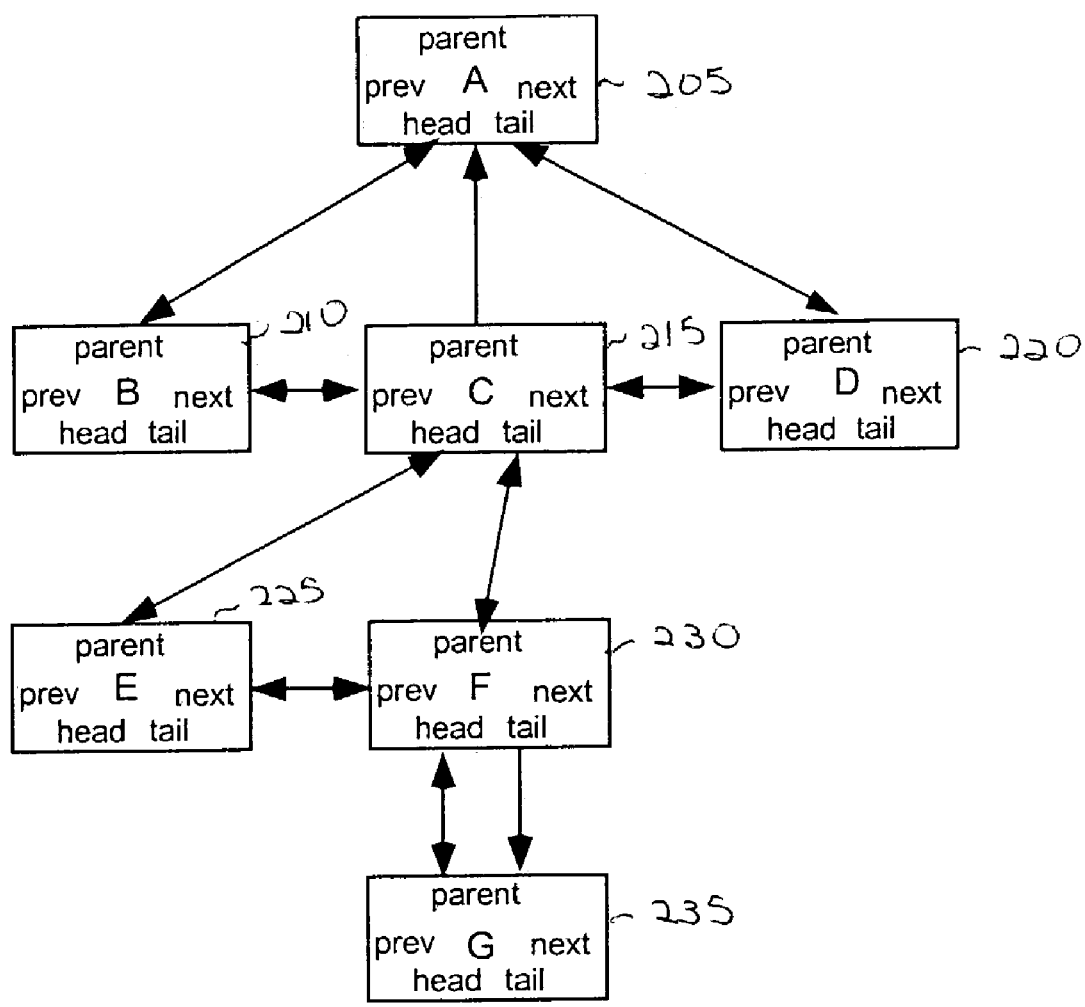

[FIGURE 3]
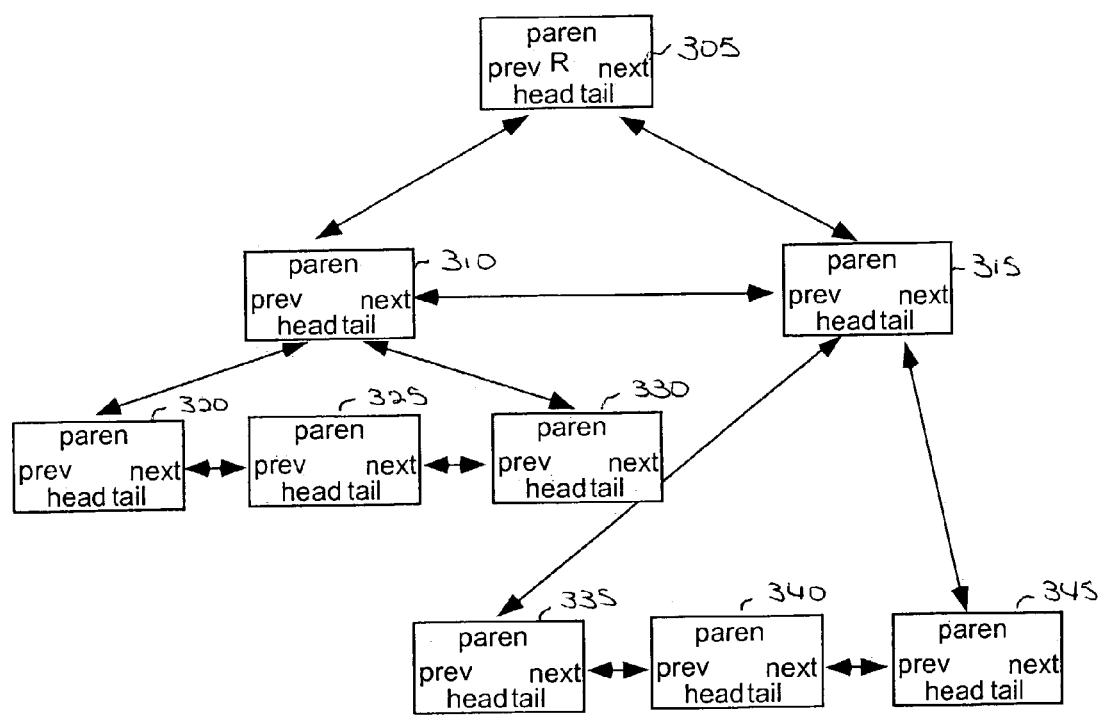

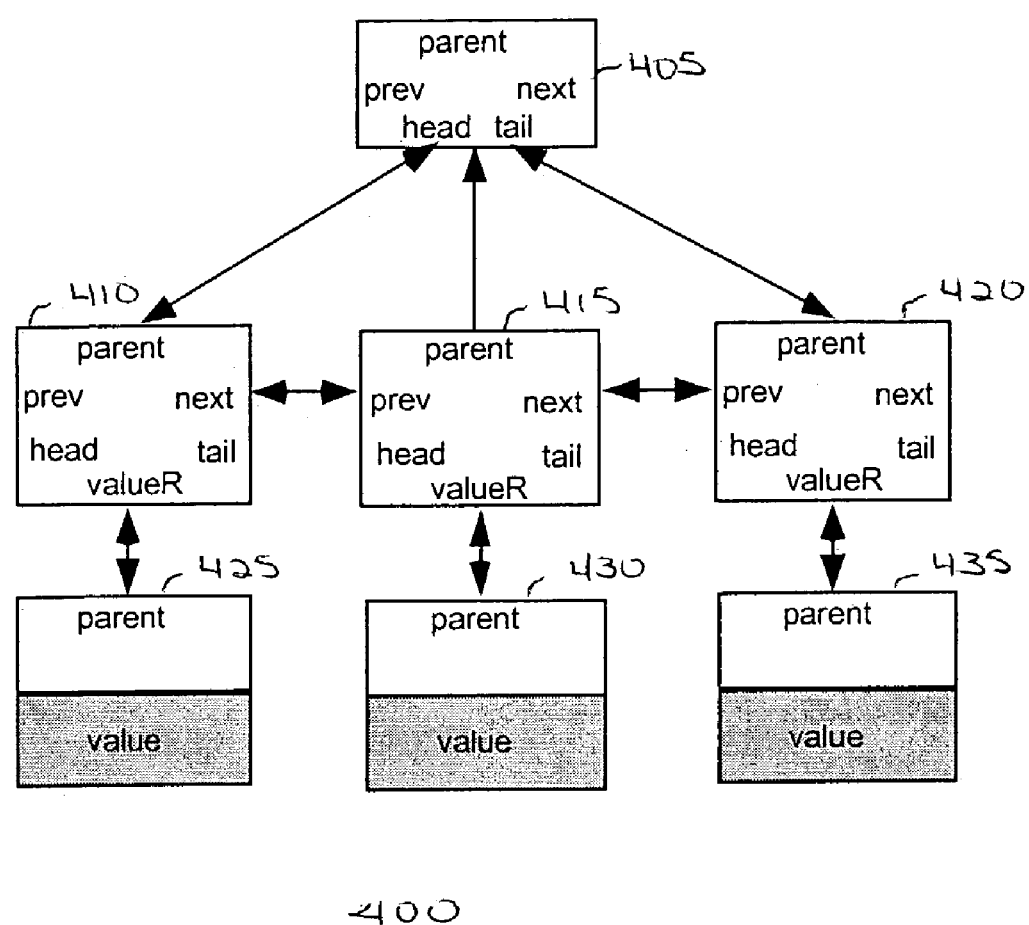
[FIGURE 4]

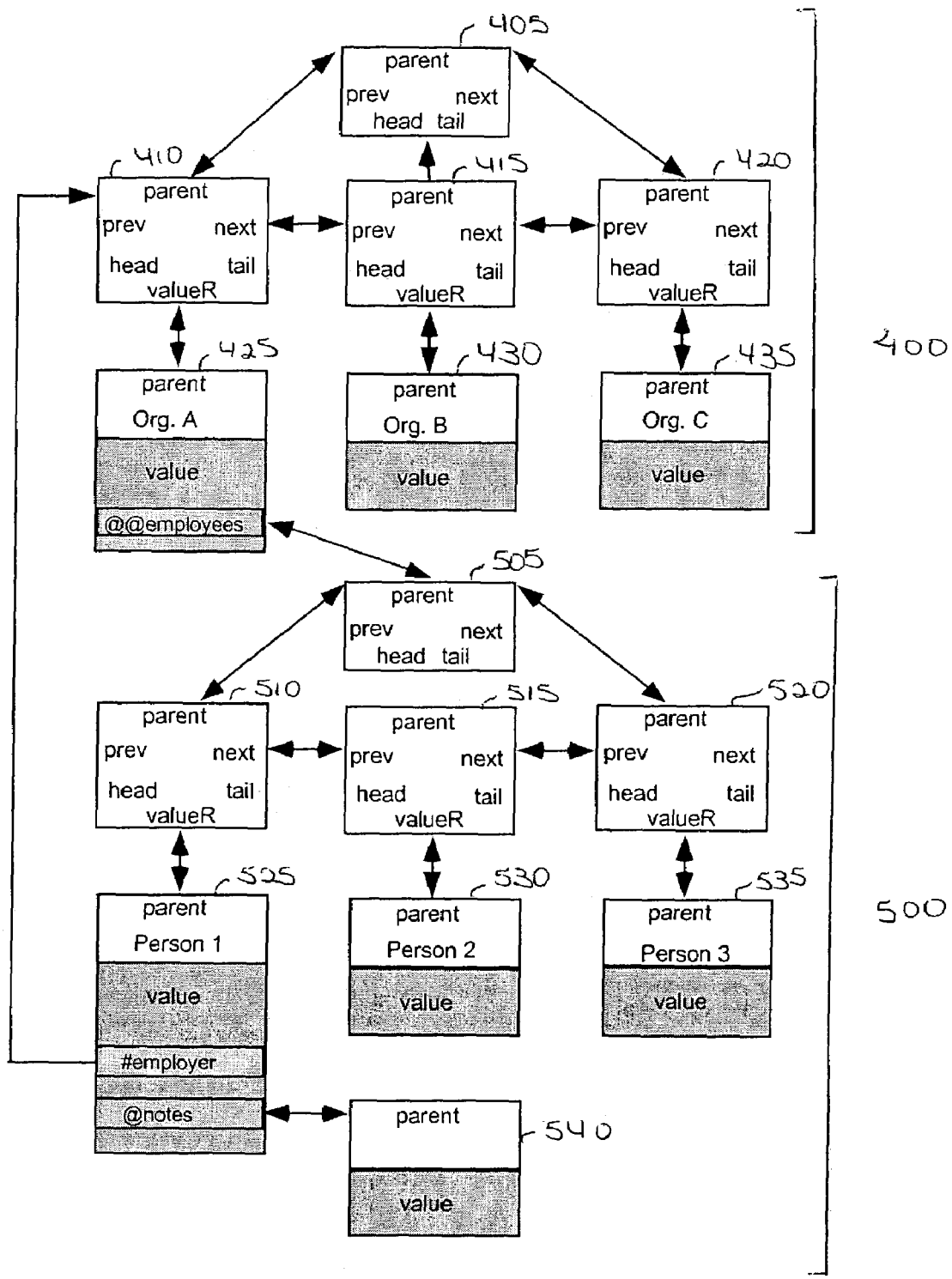
[FIGURE 5]

[FIGURE 6]
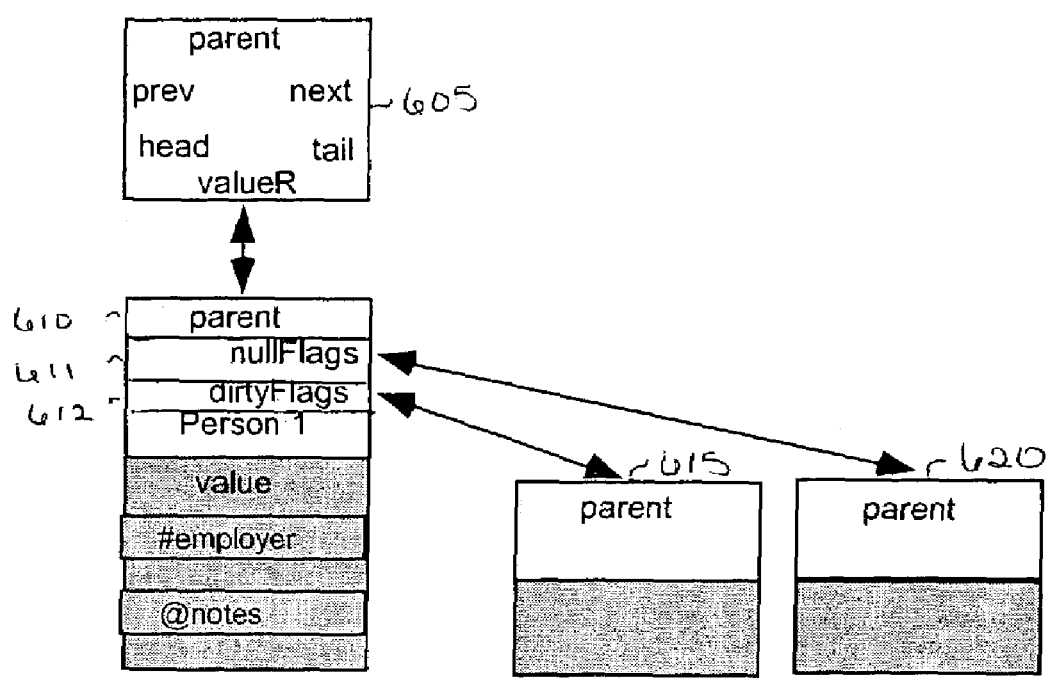

SYSTEM AND METHOD FOR MANAGING COLLECTIONS OF DATA ON A NETWORK

CROSS REFERENCE TO RELATED APPLICATION

This application is related to co-pending application Ser. No. 10/357,288 filed on Feb. 3, 2003 titled "SYSTEM AND METHOD FOR MANAGING MEMORY" now U.S. Pat. No. 7,103,749 by the same inventor of this invention, and application Ser. No. 10/357,325 filed on Feb. 3, 2003 titled "SYSTEM FOR EXCHANGING BINARY DATA" now U.S. Pat. No. 7,158,984 by the same inventor of this invention, both of which are incorporated herein by reference in their entirety for all that is taught and disclosed therein.

This application also claims the benefit of U.S. Provisional application Ser. No. 60/353,487 filed on Feb. 1, 2002 and titled "INTEGRATED MULTIMEDIA INTELLIGENCE ARCHITECTURE" which is incorporated herein by reference in its entirety for all that is taught and disclosed therein.

BACKGROUND OF THE INVENTION

There are several problems associated with sharing aggregated data in a distributed environment. The primary problems involve: (1) enabling systems to share their "knowledge" of data; (2) enabling storage of data for distribution across the computing environment; and (3) a framework for efficiently creating, persisting, and sharing data across the network. The problem of defining a run-time type system capable of manipulating strongly typed binary information in a distributed environment has been addressed in a previous patent, attached hereto as Appendix 1, hereinafter referred to as the "Types Patent". The second problem associated with sharing data in a distributed environment is the need for a method for creating and sharing aggregate collections of these typed data objects and the relationships between them. A system and method for achieving this is a 'flat', i.e., single contiguous allocation memory model, attached hereto as Appendix 2. This flat model, containing only 'relative' references, permits the data to be shared across the network while maintaining the validity of all data cross-references which are now completely independent of the actual data address in computer memory. The final problem that would preferably be addressed by such a system is a framework within which collections of such data can be efficiently created, persisted, and shared across the network. The goal of any system designed to address this problem should be to provide a means for manipulating arbitrary collections of interrelated typed data such that the physical location where the data is 'stored' is hidden from the calling code (it may in fact be held in external databases), and whereby collections of such data can be transparently and automatically shared by multiple machines on the network thus inherently supporting data 'collaboration' between the various users and processes on the network. Additionally, it should be a primary goal of such a framework that data 'storage' be transparently distributed, that is the physical storage of any given collection may be within multiple different containers and may be distributed across many machines on the network while providing the appearance to the user of the access API, of a single logical collection whose size can far exceed available computer memory.

Any system that addresses this problem would preferably support at least three different 'container' types within which the collection of data can transparently reside (meaning the caller of the API does not need to know how or where the data is actually stored). The first and most obvious is the simple case where the data resides in computer memory as supported by the 'flat' memory model. This container provides maximum efficiency but has the limitation that the collection size cannot exceed the RAM (or virtual) memory available to the process accessing it. Typically on modern computers with 32-bit architectures this puts a limit of around 2-4 GB on the size of a collection. While this is large for many applications, it is woefully inadequate for applications involving massive amounts of data in the terabyte or petabyte range. For this reason, a file-based storage container would preferably be implemented (involving one or more files) such that the user of a collection has only a small stub allocation in memory while all accesses to the bulk of the data in the collection are actually to/from file (possibly memory-cached for efficiency). Because the information in the flat memory model contains only 'relative' references, it is equally valid when stored and retrieved from file, and this is an essential feature when implementing 'shadow' containers. The file-based approach minimizes the memory footprint necessary for a collection thus allowing a single application to access collections whose total size far exceeds that of physical memory. There is essentially no limit to the size of data that can be manipulated in this manner, however, it generally becomes the case that with such huge data sets, one wants access to, and search of, the data to be a distributed problem, i.e., accomplished via multiple machines in parallel. For this reason, and for reasons of data-sharing and collaboration, a third kind of container, a 'server-based' collection would preferably be supported. Other machines on the network may 'subscribe' to any previously 'published' server-based collection and manipulate it through the identical API, without having to be aware of its possibly distributed server-based nature.

SUMMARY OF INVENTION

The present invention provides an architecture for supporting all three container types. The present invention uses the following components: (1) a 'flat' data model wherein arbitrarily complex structures can be instantiated within a single memory allocation (including both the aggregation arrangements and the data itself, as well as any cross references between them via 'relative' references); (2) a run-time type system capable of defining and accessing binary strongly-typed data; (3) a set of 'containers' within which information encoded according to the system can be physically stored and preferably include a memory resident form, a file-based form, and a server-based form, (4) a client-server environment that is tied to the types system and capable of interpreting and executing all necessary collection manipulations remotely; (5) a basic aggregation structure providing as a minimum a 'parent', 'nextChild', 'previousChild', 'firstChild', and 'lastChild' links or equivalents; and (6) a data attachment structure (whose size may vary) to which strongly typed data can be attached and which is associated in some manner with (and possibly identical to) a containing aggregation node in the collection. The invention enables the creation, management, retrieval, and distribution of massively large collections of information that can be shared across a distributed network without building absolute references or even pre-existing knowledge of the data and data structures being stored in such an environment.

The present invention also provides a number of additional features that extend this functionality in a number of important ways. For example, the aggregation models supported by the system and associated API include support for stacks, rings, arrays (multi-dimensional), queues, sets, N-trees, B-trees, and lists and arbitrary mixtures of these types within the same organizing framework including the provision of all the basic operations (via API) associated with the data structure type involved in addition to searching and sorting. The present invention further includes the ability to 'internalize' a non-memory based storage container to memory and thereafter automatically echoing all write actions to the actual container thereby gaining the performance of memory based reads with the assurance of persistence via automated echoing of writes to the external storage container. The present invention also supports server-based publishing of collections contents and client subscription thereto such that the client is transparently and automatically notified of all changes occurring to the server-based collection and is also able to transparently affect changes to that collection thereby facilitating automatic data collaborations between disparate nodes on the network. This invention and other improvements to such invention will be further explained below.

BRIEF DESCRIPTION OF THE FIGURES

FIG. 1 illustrates a sample one-dimensional structure.
FIG. 2 illustrates a generalized N-Tree.
FIG. 3 illustrates a 2*3 two-dimensional array.
FIG. 4 illustrates a sample memory structure of a collection containing 3 'value' nodes.
FIG. 5 illustrates a sample memory structure having various fields including references to other nodes in the collection.
FIG. 6 illustrates a diagrammatic representation of the null and dirty flags of the present invention.

DETAILED DESCRIPTION OF THE PREFERRED EMBODIMENT

For the purposes of this description, the existence of a client-server architecture tied to types via the 'key data type' concept, as disclosed in the Types Patent, such that the location of the server from which a given collection can be obtained will be assumed. The actual physical manifestation of a server-based collection may use any of the three container types described above (i.e., memory, file and server) thus it is possible to construct trees of server-based collections whose final physical form may be file or memory based.

To manipulate any arbitrary collection of related data in a distributed environment, some form of representation of an inherently complex and hierarchical collection of information is required. In the preferred embodiment, a 'flat' (i.e., single memory allocation) form of representation is used. The flat data-model technology attached hereto in Appendix 2 (hereinafter the "Memory Patent") provides the ideal environment for achieving this. In order to understand many of the descriptions below, the reader is referred to the Memory Patent, which is incorporated by reference herein. Just two structure variants based on this model are needed to encode collection and data information; the 'ET_Simplex' structure (which is used to hold and access the typed data described via the 'typeID' using the run-time type system described in Appendix 1 attached hereto (hereinafter the "Types Patent")) and the 'ET_Complex' structure (used to describe collections of data elements and the parent/child relationships between them). These two structures are set forth in pseudo code and defined below (in addition to the Memory Patent).

```
typedef struct ET_Simplex                            // Simplex Type record
{                                                    //
    ET_Hdr                      hdr;                 // Standard header
    int32                       size;                // size of simplex value
    (in bytes)
    ET_Offset /* ET_Simplex */  nullFlags;           // ! ! ! ref. to null
    flags simplex
    ET_Offset /* ET_Simplex */  dirtyFlags;          // ! ! ! ref. to dirty
    flags simplex
    long                        notUsed[2];          // spare
    char                        value[NULL_ARR];     // value (actual size
    varies)
} ET_Simplex;                                        //
typedef struct ET_Complex                            // Complex Type record
{                                                    //
    ET_Hdr                      hdr;                 // Standard header
    ET_LexHdl                   recognizer;          // Name recognizer DB
    (if applicable)
    Handle                      valueH;              // handle to value of
    element
    ET_Offset /* ET_SimplexPtr */ valueR;            // ref to value simplex
    union
    {
        ET_TypeID               typeID;              // ID of this type
        struct
        {
            unsInt32            crc;                 // ID viewed as a pair
            of integers
            unsInt32            flags;
        } s;
    } u;
```

-continued

| | | |
|---|---|---|
| ET_Offset /* ET_ComplexPtr */ | nextElem; | // ! ! ! link to next element |
| ET_Offset /* ET_ComplexPtr */ | prevElem; | // ! ! ! link to previous element |
| ET_Offset /* ET_ComplexPtr */ | childHdr; | // ! ! ! link to first child element |
| ET_Offset /* ET_ComplexPtr */ | childTail; | // ! ! ! link to last child element |
| long | fromWhich; | // collection type |
| int32 | dimension; | // current # of nodes children |
| char | name [kNodeNameSize]; | // element name |
| long | tag; | // tag value (if used) |
| ET_Offset /* ET_StringPtr */ | description; | // Description (if relevant) |
| ET_Offset /* ET_StringPtr */ | tags; | // ! ! ! ref. to tags string |
| ET_ElementDestructor | destructorFn; | // Custom destructor function |
| unsInt32 | shortCut; | // Shortcut sequence (if any) |
| ET_ProcreatorFn | procreator; | // Procreator function |
| long | notUsed[3]; | // not used |
| } ET_Complex; | | // |

In the preferred embodiment, the various fields within the ET_Simplex structure are defined and used as follows:

"hdr"—This is a standard header record of type ET_Hdr

"size"—This field holds the size of the 'value' array (which contains the actual typed data) in bytes.

"nullFlags"—This is a relative reference to another ET_Simplex structure containing the null flags array.

"dirtyFlags"—This is a relative reference to another ET_Simplex structure containing the dirty flags array.

"value"—This variable sized field contains the actual typed data value as determined by the 'typeID' field of the parent complex record.

The various fields within the ET_Complex structure are defined and used as follows:

"hdr"—This is a standard header record of type ET_Hdr

"recognizer"—This field may optionally hold a reference to a lexical analyzer based lookup table used for rapid lookup of a node's descendants in certain types of complex structure arrangements (e.g., a 'set'). The use of such a recognizer is an optimization only.

"valueH"—Through the API described below, it is possible to associate a typed value with a node either by incorporating the value into the collection as a simplex record (referenced via the 'valueR' field), or by keeping the value as a separate heap-allocated value referenced directly from the 'valueH' field. The use of internal values via the 'valueR' field is the default and is preferred, however, some situations may require non-flat reference to external memory, and by use of the 'valueH' field, this is possible.

"valueR"—This field contains a relative reference to the ET_Simplex record containing the value of the node (if any).

"typeID"—This field (if non-zero) gives the type ID of the data held in the associated value record.

"prevElem"—This field holds a relative reference to the previous sibling record for this node (if any).

"nextElem"—This field holds a relative reference to the next sibling record for this node (if any).

"childHdr"—This field holds a relative reference to the first child record for the node (if any).

"childTail"—This field holds a relative reference to the last child record for the node (if any).

"fromWhich"—For a root node, this field holds the complex structure variant by which the descendants of the node are organized. The minimum supported set of such values (which supports most of the basic data aggregation metaphors in common use) is as follows (others are possible):

| | |
|---|---|
| kFromArray | one dimensional array structure |
| kFromList | one directional List Structure |
| kFromStack | Stack structure |
| kFromQueue | Queue structure |
| kFromSet | Set Type |
| kFromBTree | Binary tree |
| kFromNTree | Generalized Tree with variable branches/node |
| kFromArrayN | N dimensional array structure |

"dimension"—Although it is possible to find the number of children of a given node by walking the tree, the dimension field also holds this information. In the case of multi-dimensional array accesses, the use of the dimension field is important for enabling efficient access.

"name"—Each complex node in a collection may optionally be named. A node's name is held in the "name" field. By concatenating names of a node and its ancestors, one can construct a unique path from any ancestral node to any descendant node.

"tag"—This field is not utilized internally by this API and is provided to allow easy tagging and searching of nodes with arbitrary integer values.

"description"—Arbitrary textual descriptions may be attached to any node using this field via the API provided.

"tags"—This string field supports the element tags portion of the API (see below).

"destructorFn"—If a node requires custom cleanup operations when it is destroyed, this can be accomplished by registering a destructor function whose calling address is held in this field and which is guaranteed to be called when the node is destroyed.

"shortcut"—This field holds an encoded version of a keyboard shortcut which can be translated into a node reference via the API. This kind of capability is useful in UI related applications of collections as for example the use of a tree to represent arbitrary hierarchical menus.

"procreator"—This field holds the address of a custom child node procreator function registered via the API. Whenever an attempt is made to obtain the first child of a given node, if a procreator is present, it will first be called and given an opportunity to create or alter the child nodes. This allows "lazy evaluation" of large and complex trees (e.g., a disk directory) to occur only when the user actions actually require the inner structure of a given node to be displayed.

Given the structures described above, it is clear that implementation of a one-dimensional structure is simply a matter of connecting the 'next' and 'prev' links of ET_Complex records and then providing the appropriate operations for the logical type (e.g., push/pop for a stack, queue/dequeue for a queue etc.). One familiar with data structures can readily deduce the actual algorithms involved in implementing all such operations given knowledge of the representation above.

Referring now to FIG. 1, a graphical representation of a sample one-dimensional structure is provided. In this figure, 'root' node 110 contains three child elements 120, 130, 140, all of which have the root node 110 as their direct parent but which are linked 125, 135 as siblings through the 'next' and 'prev' fields.

Referring now to FIG. 2, a graphical representation of a generalized N-Tree is shown. In this figure, the root node 205 has three child nodes 210, 215, 220 and child node 215 in turn has two children 225, 230 with node 230 itself having a single child node 235. It should be readily apparent how this approach can be extended to trees of arbitrary depth and complexity. To handle the representation of multi-dimensional arrays, we would preferably introduce additional 'dimension' nodes that serve to organize the 'leaf' or data-bearing nodes in a manner that can be efficiently accessed via array indices.

Referring now to FIG. 3, a graphical representation of a 2*3 two-dimensional array is shown. In this figure, the six nodes 320, 325, 330, 335, 340, 345 are the actual data-bearing nodes of the array. The nodes 310, 315 of root node 305 are introduced by the API in order to provide access to each 'row' of 3 elements in the array. In fact a unique feature of the array implementation in this model is that these grouping nodes can be addressed by supplying an incomplete set of indices to the API (i.e., instead of [n,m] for a 2-D array, specify [n]) which allows operations to be trivially performed on arrays that are not commonly available (e.g., changing row order). It is clear that this approach can be extended to any number of dimensions, thus for a 3-dimensional array [2*3*4], each of the nodes 320, 325, 330, 335, 340, 345 would become a parent/grouping node to a list of four child data-bearing nodes. In order to make array accesses as efficiently as possible, an additional optimization in the case of arrays whose dimensions are known at the time the collection is constructed by taking advantage of knowledge of how the allocation of contiguous node records occurs in the flat memory model. That is the offset of a desired child node for a given dimension can be calculated by "off=index*m*sizeof(ET_Complex)", thus the offset to any node in a multi-dimensional array can be efficiently obtained by recursively applying this calculation for each dimension and summing the results.

In the preferred embodiment, any node in a collection can be designated to be a new root whose 'fromWhich' may vary from that of its parent node (see TC_MakeRoot). This means for example that one can create a tree of arrays of stacks etc. Because this model permits changes to the aggregation model at any root node while maintaining the ability to directly navigate from one aggregation to the next, complex group manipulations are also supported and are capable of being performed very simply.

In order to handle the various types of non-memory storage containers associated with collections in a transparent manner, the present invention preferably includes a minimum memory 'stub' that contains sufficient information to allow access to the actual container. In the preferred embodiment, this 'stub' is comprised of a standard 'ET_TextDB' header record (see the Memory Patent) augmented by additional collection container fields. An example of such a header record in pseudo code follows:

```
typedef struct ET_FileRef                          // file reference structure
{
    short              fileID;                     // file ID for open file
    ???                fSpec;                      // file reference (platform
dependant?)
    ???                buff;                       // file buffering (platform
dependant?)
} ET_FileRef;
typedef struct ET_ComplexServerVariant
{
    char               collectionRef[128];         // unique string identifying
collection
    OSType             server;                     // server data type (0 if not
server-based)
} ET_ComplexServerVariant;
typedef union ET_ComplexContainer
{
    ET_FileRef                        file;        // file spec of file-based
mirror file
    ET_ComplexServerVariant           host;        // server container
} ET_ComplexContainer;
typedef struct ET_ComplexObjVariant
{
    ET_Offset /* ET_ComplexPtr */  garbageHdr;     // header to collection
garbage list
    ET_Offset /* ET_ComplexPtr */  rootRec;        // root record of collection
    int32                          options;        // logical options on create
call
```

```
                     -continued
ET_Offset /* ET_HdrPtr */    endRec;      // offset to last container
record
   unsInt64                  tags[8];     // eight available 64-bit tags
   ET_ComplexContainer       container;   // non-memory container
reference
} ET_ComplexObjVariant;
typedef struct ET_TextDBvariant
{
   ET_ComplexObjVariant      complex;     // complex collection variant
   ...                                    // other variants not
discussed herein
};
typedef struct ET_TextDB                  // Standard allocation header
record
{
   ET_Hdr                    hdr;         // Standard heap data
reference fields
   ET_Offset /* ET_StringPtr */  name;    // ref. to name of database
   ...                                    // other fields not discussed
herein
   ET_TextDBvariant          u;           // variant types
} ET_TextDB;
```

By examining the 'options' field of such a complex object variant (internally to the API), it is possible to identify if a given collection is memory, file, or server-based and, by using the additional fields defined above, it is also possible to determine where the collection resides. One embodiment of a basic code structure which supports implementation of any of the API calls defined below is defined as follows:

```
MyAPIcall (ET_CollectionHdl  aCollection,...)
{
    if ( collection is server-based )
    {
        pack necessary parameters into a server command
        send the command to server u.complex.host.server
        unpack the returned results as required
    } else if ( collection is file-based )
    {
        perform identical operations to the memory case but by file I/O access
        if this collection is published
            echo all changes to any subscribers
    } else
    {
        perform the operation on the flat memory model
        if ( the collection has been 'internalized' from file
            echo all changes to the file
        if this collection is published
            echo all changes to any subscribers
    }
}
```

In the memory based case, the code checks to see if the collection is actually an 'internalized' file-based collection (see option 'kInternalizeIfPossible' as defined below) and if so, echoes all operations to the file. This allows for an intermediate state in terms of efficiency between the pure memory-based and the file-based containers in that all read operations on such an internalized collection occur with the speed of memory access while only write operations incur the overhead of file I/O, and this can be buffered/batched as can be seen from the type definitions above. Note also that in both the file and memory based cases, the collection may have been 'published' and thus it may be necessary to notify the, subscribers of any changes in the collection. This is also the situation inside the server associated with a server-based collection. Within the server, the collection appears to be file/memory based (with subscribers), whereas to the subscribers themselves, the collection (according to the memory stub) appears to be server-based.

Server-based collections may also be cached at the subscriber end for efficiency purposes. In such a case, it may be necessary to notify the subscribers of the exact changes made to the collection. This enables collaboration between multiple subscribers to a given collection and this collaboration at the data representation level is essential in any complex distributed system. The type of collaboration supported by such a system is far more powerful than the UI-level collaboration in the prior art because it leaves the UI of each user free to display the data in whatever manner that user has selected while ensuring that the underlying data (that the UI is actually visualizing) remains consistent across all clients. This automation and hiding of collaboration is a key feature of this invention. In the preferred embodiment, the UI itself can also be represented by a collection, and thus UI-level collaboration (i.e., when two users screens are synchronized to display the same thing) is also available as a transparent by-product of this approach simply by having one user 'subscribe' to the UI collection of the other.

Referring now to FIG. 4, a sample memory structure of a collection containing 3 'value' nodes is shown. As explained above, the job of representing aggregates or collections of data is handled primarily by the ET_Complex records 405, 410, 415, 420, while that of holding the actual data associated with a given node is handled by the ET_Simplex records 425, 430, 435. One advantage of utilizing two separate records to handle the two aspects is that the ET_Simplex records 425, 430, 435 can be variably sized depending on the typeID of the data within them, whereas the ET_Complex records 405, 410, 415, 420 are of a fixed size. By separating the two records, the navigation of the complex records 405, 410, 415, 420 is optimized. In the preferred embodiment, the various fields of a given type may also include references to other nodes in the collection either via relative references (denoted by the '@' symbol), collection references (denoted by the '@@' symbol) or persistent references (denoted by the '#' symbol). This means, for example, that one of the fields of a simplex record 425, 430, 435 may in-fact refer to a new collection with a new root node embedded within the same memory allocation as the parent collection that contains it.

Referring now to FIG. 5, a sample memory structure having various fields including references to other nodes in the collection is shown. In this figure, the 'value' of a node 425 represents an organization. In this case, one of the fields is the employees of the organization. This figure illustrates the three basic types of references that may occur between the various ET_Simplex records 425, 430, 435, 525, 530, 535, 540 and ET_Complex records 405, 410, 415, 420, 505, 510, 515, 520 in a collection. The relative reference '@' occurs between two simplex nodes 525, 540 in the collection, so that if the 'notes' field of a node 525 were an arbitrary length character string, it would be implemented as a relative reference (char @notes) to another simplex record 540 containing a single variable sized character array. This permits the original "Person" record 525 to have fixed size and an efficient memory footprint, while still being able to contain fields of arbitrary complexity within it by relative reference to another node 540. Another use of such a reference might be to a record containing a picture of the individual. This would be implemented in an identical manner (Picture @Picture) but the referenced type would be a Picture type rather than a character array.

The collection reference '@@' in record 425 indicates that a given field refers to a collection 500 (possibly hierarchical) of values of one or more types and is mediated by a relative reference between the collection field of record 425 and the root node 505 of an embedded collection 500 containing the referenced items. In the preferred embodiment, this embedded collection 500 is in all ways identical to the outer containing collection 400, but may only be navigated to via the field that references it. It is thus logically isolated from the outermost collection 400. Thus the field declaration "Person @@employees" in record 425 implies a reference to a collection 500 of Person elements. Obviously collections can be nested within each other to an arbitrary level via this approach and this gives incredible expressive power while still maintaining the flat memory model. Thus for example one might reference a 'car', which internally might reference all the main components (engine, electrical system, wheels) that make up the car, which may in turn be built up from collections of smaller components (engine parts, electrical components, etc).

The persistent reference '#', illustrated as a field in record 525, is a singular reference from a field of an ET_Simplex record to an ET_Complex node containing a value of the same or a different type. The reference node can be in an embedded collection 500 or more commonly in an outer collection 400. In this case the 'employer' field of each employee of a given organization (#employer) would be a persistent reference to the employing organization as shown in the diagram. Additional details of handling and resolving collection and persistent references is provided in Appendix 2.

In order to make efficient use of any space freed up by deleted nodes, the collections mechanism can also maintain a garbage list, headed by a field in the collection variant of the base ET_TextDB record. Whenever any record is deleted, it could added into a linked list headed by this field and whenever a new record is allocated the code would first examine the garbage list to find any unused space that most closely fits the needs of the record being added. This would ensure that the collection did not become overly large or fragmented, and to the extent that the ET_Complex nodes and many of the ET_Simplex nodes have fixed sizes, this reclamation of space is almost perfect.

Another key feature of this invention is the concept of 'dirty' and 'null' flags, and various API calls are provided for this purpose (as described below). The need for 'null' flags is driven by the fact that in real world situations there is a difference between a field having an undefined or NULL value and that field having the value zero. In database situations, an undefined value is distinguished from a zero value because semantically they are very different, and zero may be a valid defined value. Similarly, the present invention may use null and dirty flags to distinguish such situations. Referring now to FIG. 6, a diagrammatic representation of the null and dirty flags of the present invention are shown. In this figure, the null and dirty flags are implemented by associating child simplex nodes 615 and 620, referenced from the simplex record 610 associated with any given valued collection node 605 for which empty/dirty tracking is required, via dedicated fields ("dirtyFlags") and 611 ("nullFlags"). Each flags array is simply a bit-field containing as many bits as there are fields in the associated type and whose dimensions are given by the value of TM_GetTypeMaxFlagIndex( ) (see Types Patent). If a field 610 has a null value, the corresponding bit in the 'nullFlags' record 611 is set to one, otherwise it is zero. Similarly, if a field 610 is 'dirty', the corresponding bit in the 'dirtyFlags' record 612 is set to one, otherwise it is zero. The requirement for the 'dirty' flag is driven by the need to track what has changed within a given record since it was first instantiated. This comes up particularly when the record is being edited by an associated UI. By examining the dirty flags after such an editing session it is possible to determine-exactly which fields need to be updated to external storage such as an associated relational database.

In certain situations, especially those encountered when implementing high performance servers for data held in the collection model, it is necessary to add additional binary descriptive and reference fields to the collection to facilitate efficient navigation (e.g., in an inverted file implementation). The present invention supports this functionality by allowing the ET_Complex record to be extended by an arbitrary number of bytes, hereinafter termed 'extra bytes', within which information and references can be contained that are known only to the server (and which are not shared with clients/subscribers). This is especially useful for security tags and similar information that would preferably be maintained in a manner that is not accessible from the clients of a given collection. This capability would generally need to be customized for any particular server-based implementation.

Another requirement for effective sharing of information across the network is to ensure that all clients to a given collection have a complete knowledge of any types that may be utilized within the collection. Normally subscribers would share a common types hierarchy mediated via the types system (such as that described in the Types Patent. Such a types system, however, could also include the ability to define temporary and proxy types. In the case of a shared collection, this could lead to problems in client machines that are unaware of the temporary type. For this reason, the collections API (as described below) provides calls that automatically embed any such type definitions in their source (C-like) form within the collection. The specialized types contained within a collection could, then be referenced from a field of the ET_TextDB header record and simply held in a C format text string containing the set of type definition sources. Whenever code subscribes to a collection, the API automatically examines this field and instantiates/defines all types found in the local context (see TM_DefineNewType described below). Similarly when new types are added to the collection, the updates to this type definition are propagated (as for all other changes except extra-bytes within the collection) and thus the clients of a given collection are kept up to date with the necessary type information for its interpretation.

When sharing and manipulating large amounts of data, it is also often necessary to associate arbitrary textual and typed binary tags with the data held within a collection. Examples of this might be tags associated with UI appearance, user annotations on the data, etc. This invention fully supports this capability via the "element Tag" API calls provided to access them. In the preferred embodiment, the element tags associated with a given node in the collection are referenced via the 'tags' field of the ET_Complex record which contains a relative reference to a variable sized ET_String record containing the text for the tags. In a manner identical to that used in annotations and scripts (described below), tags could consist of named blocks of arbitrary text delimited by the "<on>" and "<no>" delimiter sequences occurring at the start of a line. The "<on>" delimiter is followed by a string on the same line which gives the name of the tag involved. By convention, all tag names start with the '$' character in order to distinguish them from field names which do not. Some of the API calls below support access to tags as well as fields via dual use of the 'fieldName' parameter. For example, it is possible to sort the elements of a collection based on the associated tags rather than the data within. This can be very useful in some applications involving the manipulation and grouping of information via attributes that are not held directly within the data itself. In an implementation in which the tags are associated with the ET_Complex record, not the ET_Simplex, the collections can be created and can contain and display information without the need to actually define typed values. This is useful in many situations because tags are not held directly in a binary encoding. While this technique has the same undesirable performance penalties of other text-based data tagging techniques such as XML, it also provides all the abilities of XML tagging over and above the binary types mechanism described previously, and indeed the use of standardized delimiters is similar to that found in XML and other text markup languages. In such an implementation, when accessing tag information, the string referenced by the 'tags' field is searched for the named tag and the text between the start and end delimiters stripped out to form the actual value of the tag. By use of a standardized mechanism for converting binary typed values to/from the corresponding text string, tags themselves may be strongly typed (as further illustrated by the API calls below) and this capability could be used extensively for specialized typed tags associated with the data. Tags may also be associated either with the node itself, or with individual fields of the data record the node contains. This is also handled transparently via the API by concatenating the field path with the tag name to create unique field-specific tags where necessary. As will be understood by those skilled in the art, the ability to associate arbitrary additional textual and typed tags with any field of a given data value within the collection allows a wide range of powerful capabilities to be implemented on top of this model.

Appendix A provides a listing of a basic API suite that may be used in conjunction with the collection capability of this invention. This API is not intended to be exhaustive, but is indicative of the kinds of API calls that are necessary to manipulate information held in this model. The following is a brief description of the function and operation of each function listed, from which, given the descriptions above, one skilled in the art would be able to implement the system of this invention.

A function that may be included in the API, hereinafter referred to as TC_SetCollectionName( ), sets the name of a collection (as returned by TC_GetCollectionName) to the string specified. A function that may also be included in the API, hereinafter referred to as TC_GetCollectionName( ), that obtains the name of a collection.

A function that may also be included in the API, hereinafter referred to as TC_FindEOFhandle( ), that finds the offset of the final null record in a container based collection.

A function that may also be included in the API, hereinafter referred to as TC_SetCollectionTag( ) and TC_GetCollectionTag( ), that allow access to and modification of the eight 64-bit tag values associated with every collection. In the preferred embodiment, these tag values are not used internally and are available for custom purposes.

A function that may also be included in the API, hereinafter referred to as TC_SetCollectionFlags( ), TC_ClrCollectionFlags( ), and TC_GetCollectionFlags( ), that would allow access to and modification of the flags associated with a collection.

A function that may also be included in the API, hereinafter referred to as TC_StripRecognizers( ), which strips the recognizers associated with finding paths in a collection. The only effect of this would be to slow down symbolic lookup but would also save a considerable amount of memory.

A function that may also be included in the API, hereinafter referred to as TC_StripCollection( ), strips off any invalid memory references that may have been left over from the source context.

A function that may also be included in the API, hereinafter referred to as TC_OpenContainer( ), opens the container associated with a collection (if any). In the preferred embodiment, once a collection container has been closed using TC_CloseContainer( ), the collection API functions on the collection itself would not be usable until the container has been re-opened. The collection container is automatically created/opened during a call to TC_CreateCollection( ) so no initial TC_OpenContainer( ) call is required.

A function that may also be included in the API, hereinafter referred to as TC_CloseContainer( ), closes the container associated with a collection (if any). In the preferred embodiment, once a collection container has been closed using TC_CloseContainer( ), the collection API functions on the collection itself would not be usable until the container had been re-opened.

A function that may also be included in the API, hereinafter referred to as TC_GetContainerSpec( ), may be used to obtain details of the container for a collection. In the preferred embodiment, if the collection is not container based, this function would return 0. If the container is file-based, the 'specString' variable would be the full file path. If the container is server-based, 'serverSpec' would contain the server concerned and 'specString' would contain the unique string that identifies a given collection of those supported by a particular server.

A function that may also be included in the API, hereinafter referred to as TC_GetDataOffset( ), may be used to obtain the offset (in bytes) to the data associated with a given node in a collection. For example, this offset may be used to read and write the data value after initial creation via TC_ReadData( ) and TC_WriteData( ).

A function that may also be included in the API, hereinafter referred to as TC_GetRecordOffset( ), may be used to obtain the record offset (scaled) to the record containing the data associated with a given node in a collection. This offset may be used in calculating the offset of other data within the collection that is referenced from within a field of the data itself (via a relative, persistent, or collection offset—@, #, or @@). For example if you have a persistent reference field (ET_PersistentRef) from collection element 'sourceElem' within which the 'elementRef' field is non-zero, the element designation for the target element ('targetElem', i.e., a scaled offset from the start of the collection for the target collection node) can be computed as:

targetElem=perfP.elementRef+TC_GetRecordOffset
(aCollection,0,0,sourceElem,NO);

The corresponding data offset for the target element would then be:

targetDataOff=TC_GetDataOffset(aCollection,0,0,
targetElem);

Functions that may also be included in the API, hereinafter referred to as TC_RelRefToDataOffset( ), TC_DataOffsetToRelRef( ), TC_RelRefToRecordOffset( ), TC_DataToRecordOffset( ), TC_RecordToDataOffset( ), TC_ByteToScaledOffset( ), and TC_ScaledToByteOffset( ), could be used to convert between the "data offset" values used in this API (see TC_GetDataOffset, TC_ReadData, TC_WriteData, and TC_CreateData), and the ET_Offset values used internally to store relative references (i.e., '@' fields). In the preferred embodiment, the routine TC_RefToRecordOffset( ) would be used in cases where the reference is to an actual record rather than the data it contains (e.g., collection element references). Note that because values held in simplex records may grow, it may be the case that the "data offset" and the corresponding "record offset" are actually in two very different simplex records. In on embodiment, the "record offset" always refers to the 'base' record of the simplex, whereas the "data offset" will be in the 'moved' record of the simplex if applicable. For this reason, it is essential that these (or similar) functions are used when accessing collections rather than attempting more simplistic calculations based on knowledge of the structures, as such calculations would almost certainly be erroneous.

A function that may also be included in the API, hereinafter referred to as TC_RelRefToElementDesignator( ), which could be used to return the element designator for the referenced element, given a relative reference from one element in a collection to another.

A function that may also be included in the API, hereinafter referred to as TC_PersRefToElementDesignator( ), which could be used to return the element designator for the referenced element, given a persistent or collection reference (e.g., the elementRef field of either) from the value of one element in a collection to the node element of another.

A function that may also be included in the API, hereinafter referred to as TC_ElementDesignatorToPersRef( ), which, if given an element designator, could return the relative reference for a persistent or collection reference (e.g., the elementRef field of either) from the value of one element in a collection to the node element of another.

A function that may also be included in the API, hereinafter referred to as TC_ValueToElementDesignator( ), given the absolute ET_Offset to a value record (ET_Simplex) within a collection, could be used to return the element designator for the corresponding collection node (element designator). This might be needed, for example, with the result of a call to TC_GetFieldPersistentElement( ).

A function that may also be included in the API, hereinafter referred to as TC_LocalizeRelRefs( ), can be called to achieve the following effect for an element just added to the collection: It is often convenient for relative references (i.e., @fieldName) to be held as pointer values until the time the record is actually added to the collection. At this time the pointer values held in any relative reference fields would preferably be converted to the appropriate relative reference and the original (heap allocated) pointers disposed.

A function that may also be included in the API, hereinafter referred to as TC_ReadData( ), can be used to read the value of a collection node (if any) into a memory buffer. In the preferred embodiment, this routine would primarily be used within a sort function as part of a 'kFindCPX' (TC_Find) or kSortCPX (TC_Sort) call. The purpose for supplying this call is to allow sort functions to optimize their container access or possibly cache results (using the custom field in the sort record). The collection handle can be obtained from "elementRef.theView" for one of the comparison records, the 'size' parameter is the 'size' field of the record (or less) and the 'offset' parameter is the "u.simplexOff" field. In such a case, the caller would be responsible for ensuring that the 'aBuffer' buffer is large enough to hold 'size' bytes of data.

A function that may also be included in the API, hereinafter referred to as TC_WriteData( ), which could be used to write a new value into an existing node within a collection handle.

A function that may also be included in the API, hereinafter referred to as TC_WriteFieldData( ), which could be used to write a new value into a field of an existing node within a collection handle.

A function that may also be included in the API, hereinafter referred to as TC_CreateData( ), could be used to create and write a new unattached data value into a collection. The preferred way of adding data to a collection is to use TC_SetValue( ). In the case where data within a collection makes a relative reference (i.e, via a '@' field) to other data within the collection, however, the other data may be created using this (or a similar) function.

A function that may also be included in the API, hereinafter referred to as TC_CreateRootNode( ), could be used to create and write a new unattached root node into a collection handle. In the case where data within a collection makes a collection reference (i.e, via a '@@' field) to other data that is to be internalized into the same collection handle, it is preferable to create an entirely separate root node that is not directly part of the parent collection yet lies within the same handle.

A function that may also be included in the API, hereinafter referred to as TC_CreateRecord( ), could be used to create specified structures within a collection, including all necessary structures to handle container-based objects and persistent storage. In the preferred embodiment, the primary purpose for using this routine would be to create additional structures within the collection (usually of kSimplexRecord type) that can be referenced from the fields of other collection elements. Preferably, this type of function would only be used to create the following structure types: kSimplexRecord, kStringRecord, kComplexRecord.

A function that may also be included in the API, hereinafter referred to as TC_CreateCollection( ), could be used to create (initialize) a collection, i.e. a container object—such as an array, or a tree, or a queue or stack, or a set—to hold objects of any type which may appear in the Type Manager database. For example, if the collection object is an array, then a size, or a list of sizes, would preferably be supplied.

If the collection is of unspecified size, no sizing parameter need be specified. Possible collection types and the additional parameters that would preferably be supplied to create them are as follows:

| | |
|---|---|
| kFromList | List Structure |
| kFromStack | Stack structure |
| kFromQueue | Queue structure |
| kFromSet | Set |
| kFromBTree | Binary tree |
| kFromNTree | Generalized Tree |
| no additional parameters | |
| kFromArray | one dimensional array structure |
| dimension1 (int32) | array dimension (as in C) |
| kFromArrayN | N dimensional array structure |
| N (int32) | number of dimensions |
| dimension1 (int32) | array dimension 1 (as in C) |
| ... | |
| dimensionN (int32) | array dimension N (as in C) |

A function that may also be included in the API, hereinafter referred to as TC_KillReferencedMemory( ), which could be provided in order to clean up all memory associated with the set of data records within a collection. This does not include any memory associated with the storage of the records themselves, but simply any memory that the fields within the records reference either via pointers or handles. Because a collection may contain nested collections to any level, this routine would preferably recursively walk the entire collection hierarchy, regardless of topology, looking for simplex records and for each such record found, would preferably de-allocate any referenced memory. It is assumed that all memory referenced via a pointer or a handle from any field within any structure represents a heap allocation that can be disposed by making the appropriate memory manager call. It is still necessary to call TC_DisposeCollection( ) after making this call in order to clean up memory associated with the collection itself and the records it contains.

A function that may also be included in the API, hereinafter referred to as TC_DisposeCollection( ), which could be provided in order to delete a collection. If the collection is container based, then this call will dispose of the collection in memory but has no effect on the contents of the collection in the container. The contents of containers can only be destroyed by deleting the container itself (e.g., if the container is a file then the file would preferably be deleted).

A function that may also be included in the API, hereinafter referred to as TC_PurgeCollection( ), which could be provided in order to compact a collection by eliminating all unused records. After a long sequence of adds and deletes from a collection, a 'garbage' list of records may build up containing records that are not currently used but which are available for recycling, these records are eliminated by this call. Following a purge, all references to internal elements of the collection may be invalidated since the corresponding record could have moved. It is essential that you re-compute all such internal references after a purge.

A function that may also be included in the API, hereinafter referred to as TC_CloneRecord( ), which could be provided in order to clone an existing record from one node of a collection to another node, possibly in a different collection. Various options allow the cloning of other records referenced by the record being cloned. Resolved persistent and collection references within the record are not cloned and would preferably be re-resolved in the target. If the structure contains memory references and you do not specify 'kCloneMemRefs', then memory references (pointers and handles found in the source are NULL in the target), otherwise the memory itself is cloned before inserting the corresponding reference in the target node. If the 'kCloneRelRefs' option is set, relative references, such as those to strings are cloned (the cloned references are to new copies in the target collection), otherwise the corresponding field is set to zero.

A function that may also be included in the API, hereinafter referred to as TC_CloneCollection( ), which could be provided in order to clone all memory associated with a type manager collection, including all memory referenced from fields within the collection (if 'recursive' is true).

A function that may also be included in the API, hereinafter referred to as TC_AppendCollection( ), which could be provided in order to append a copy of one collection in its entirety to the designated node of another collection. In this manner multiple existing collections could be merged into a single, larger collection. In the preferred embodiment, when merging the collections, the root node of the collection being appended and all nodes below it, are transferred to the target collection with the transferred root node becoming the first child node of non-leaf 'tgtNode' in the target collection.

A function that may also be included in the API, hereinafter referred to as TC_PossessDisPossessCollection( ), which could be provided in order to can be used to possess/dispossess all memory associated with a type manager collection, including all memory referenced from fields within the collection.

A function that may also be included in the API, hereinafter referred to as TC_LowestCommonAncestor( ), which could be provided in order to search the collection from the parental point designated and determine the lowest common ancestral type ID for all elements within.

A function that may also be included in the API, hereinafter referred to as TC_FindFirstDescendant( ), which could be provided in order to search the collection from the parental point designated and find the first valued node whose type is equal to or descendant from the specified type.

A function that may also be included in the API, hereinafter referred to as TC_IsValidOperation( ), which could be provided in order to determine if a given operation is valid for the specified collection.

A function that may also be included in the API, hereinafter referred to as TC_vComplexOperation( ), which is identical to TC_ComplexOperation( ) but could instead take a variable argument list parameter which would preferably be set up in the caller as in the following example:

| | |
|---|---|
| va_list | ap; |
| Boolean | res; |
| va_start (ap, aParameterName); | |
| res = TC_vComplexOperation(aCollection,theParentRef,anOperation, options,&ap); | |
| va_end(ap); | |

A function that may also be included in the API, hereinafter referred to as TC_ComplexOperation( ), which could be provided in order to perform a specified operation on a collection. In the preferred embodiment, the appropriate specific wrapper functions define the operations that are possible, the collection types for which they are supported, and the additional parameters that would preferably be specified to accomplish the operation. Because of the common approach used to implement the various data structures, it is possible to apply certain operations to collection types for which those operations would not normally be supported. These additional operations could be very useful in manipulating collections in ways that the basic collection type would make difficult.

A function that may also be included in the API, hereinafter referred to as TC_Pop( ), which could be provided in order to pop a stack. When applied to a Queue, TC_Pop( ) would remove the last element added, when applied to a, List or set, it would remove the last entry in the list or set. When applied to a tree, the tail child node (and any children) is removed. For a stack, the pop action follows normal stack behavior. This function may also be referred to as TC_RemoveRight( ) when applied to a binary tree.

A function that may also be included in the API, hereinafter referred to as TC_Push( ), which could be provided in order to push a stack. When applied to a List or Set, this function would add an element to the end of the list/set. When applied to a tree, a new tail child node would be added. For a stack, the push action follows normal stack behavior. This function may also be referred to as TC_EnQueue( ) when applied to a queue, or TC_AddRight( ) when applied to a binary tree.

A function that may also be included in the API, hereinafter referred to as TC_Insert( ), could be provided in order to insert an element into a complex collection list.

A function that may also be included in the API, hereinafter referred to as TC_SetExtraBytes( ), could allow the value of the extra bytes associated with a collection element node record (if any) to be set. In the preferred embodiment, the use of this facility is strongly discouraged except in cases where optimization of collection size is paramount. Enlarged collection nodes can be allocated by passing a non-zero value for the 'extraBytes' parameter to TC_Insert( ). This call would create additional empty space after the node record that can be used to store an un-typed fixed sized record which can be retrieved and updated using calls such as TC_GetExtraBytes( ) and TC_SetExtraBytes( ) respectively. This approach is primarily justified because the additional bytes do not incur the overhead of the ET_Simplex record that normally contains the value of a collection element's node and which is accessed by all other TC_API calls. If data is associated with a node in this manner, a destructure function would preferably be associated with a node to be disposed when the collection is killed, such as making a call to a function such as TC_SetElementDestructor( ).

A function that may also be included in the API, hereinafter referred to as TC_GetExtraBytes( ), which could be provided in order to get the value of the extra bytes associated with a collection element node record (if any). See TC_SetExtraBytes( ) for details.

A function that may also be included in the API, hereinafter referred to as TC_Remove( ), could be provided in order to remove the value (if any) from a collection node.

A function that may also be included in the API, hereinafter referred to as TC_IndexRef( ), could be provided in order to obtain a reference 'ET_Offset' to a specified indexed element (indices start from 0). This reference can be used for many other operations on collections. When used to access data in a multi-dimensional array, it is essential that all array indices are specified. However, each 'dimension' of a multi-dimensional array can be separately manipulated using a number of operations (e.g., sort) and thus a partial set of indices may be used to obtain a reference to the elements of such a dimension (which do not normally contain data themselves, though they could do) in order to manipulate the elements of that dimension. In this manner, a multi-dimensional array can be regarded as a specialized case of a tree.

When multiple indices are used to refer to a tree, later indices in the list refer to deeper elements of the tree. In such a case, a subset of the indices should be specified in order to access a given parental node in the tree. Note that in the tree case, the dimensionality of each tree node may vary and thus using such an indexed reference would only make sense if a corresponding element exists.

A function that may also be included in the API, hereinafter referred to as TC_MakeRoot( ), could be provided in order to convert a collection element to the root of a new subordinate collection. This operation can be used to convert a leaf node of an existing collection into the root node of a new subordinate collection. This is the mechanism used to create collections within collections. Non-leaf nodes cannot be converted.

A function that may also be included in the API, hereinafter referred to as TC_Sort( ), could be provided in order to sort the children of the specified parent node according to a sorting function specified in the 'cmpFun' parameter. Sorting may be applied to any collection type, including arrays. Note that the comparison function is passed two references to a record of type 'ET_ComplexSort'. Within these records is a reference to the original complex element, as well as any associated data and the type ID. The 'fromWhich' field of the record will be non-zero if the call relates to a non-leaf node (for example in a tree). The 'kRecursiveOperation' option applies for hierarchical collections.

A function that may also be included in the API, hereinafter referred to as TC_UnSort( ), which could be provided in order to un-sort the children of the specified parent node back into increasing memory order. For arrays, this is guaranteed to be the original element order, however, for other collection types where elements can be added and removed, it does not necessarily correspond since elements that have been removed may be re-cycled later thus violating the memory order property. The 'kRecursiveOperation' option applies for hierarchical collections.

A function that may also be included in the API, hereinafter referred to as TC_SortByField( ), which could be provided in order to sort the children of the specified parent node using a built-in sorting function which sorts based on specified field path which would preferably refer to a field whose type is built-in (e.g., integers, strings, reals, struct etc.) or some descendant of one of these types. Sorting may be applied to any collection type, including arrays. The 'kRecursiveOperation' option applies for hierarchical collections. In the preferred embodiment, if more complex sorts are desired, TC_Sort( ) short should be used and 'cmpFun' supplied. This function also could also be used to support sorting by element tags (field name starts with '$').

A function that may also be included in the API, hereinafter referred to as TC_DeQueue( ), could be provided in order to de-queue an element from the front of a queue. The operation is similar to popping a stack except that the element comes from the opposite end of the collection. In the preferred embodiment, when applied to any of the other collection types, this operation would return the first element in the collection. This function may also be referred to as TC_RemoveLeft( ) when applied to a binary tree.

A function that may also be included in the API, hereinafter referred to as TC_Next( ), which could be provided in order to return a reference to the next element in a collection given a reference to an element of the collection. If there is no next element, the function would return FALSE.

A function that may also be included in the API, hereinafter referred to as TC_Prev( ), which could be provided in order to return a reference to the previous element in a collection given a reference to an element of the collection. If there is no previous element, the function returns FALSE.

A function that may also be included in the API, hereinafter referred to as TC_Parent( ), which could be provided in order to return a reference to the parent element of a collection given a reference to an element of the collection. In the preferred embodiment, the value passed in the 'theParentRef' parameter is ignored and should thus be set to zero.

A function that may also be included in the API, hereinafter referred to as TC_RootRef( ), could be provided in order to return a reference to the root node of a collection. This (or a similar) call would only be needed if direct root node manipulation is desired which could be done by specifying the value returned by this function as the 'anElem' parameter to another call. Note that root records may themselves be directly part of a higher level collection. The check for this case can be performed by using TC_Parent( ) which will return 0 if this is not true.

A function that may also be included in the API, hereinafter referred to as TC_RootOwner( ), could be provided in order to return a reference to the simplex structure that references the collection containing the element given. In the preferred embodiment, if the element is part of the outermost collection, it is by definition not owned and this function returns false. If the root node is not owned/referenced by a simplex record, this function returns false, otherwise true. If the collection containing 'anElem' contains directly nested collections, this routine will climb the tree of collections until it finds the owning structure (or fails).

A function that may also be included in the API, hereinafter referred to as TC_Head( ), could be provided in order to return a reference to the head element in a collection of a given parent reference. If there is no head element, the function would return FALSE. For a binary tree, TC_LeftChild( ) would preferably be used.

A function that may also be included in the API, hereinafter referred to as TC_Tail( ), could be provided in order to return a reference to the tail element in a collection of a given parent reference. If there is no tail element, the function would return FALSE. For a binary tree, TC_RightChild( ) would preferably be used.

A function that may also be included in the API, hereinafter referred to as TC_Exchange( ), could be provided in order to exchange two designated elements of a collection.

A function that may also be included in the API, hereinafter referred to as TC_Count( ), could be provided in order to return the number of child elements for a given parent. In the preferred embodiment, for non-hierarchical collections, this call would return the number of entries in the collection.

A function that may also be included in the API, hereinafter referred to as TC_SetValue( ), could be provided in order to set the value of a designated collection element to the value and type ID specified.

A function that may also be included in the API, hereinafter referred to as TC_SetFieldValue( ), which could be provided in order to set the value of a field within the specified collection element.

A function that may also be included in the API, hereinafter referred to as TC_GetAnonRefFieldPtr( ), which could be provided in order to obtain a heap pointer corresponding to a reference field (either pointer, handle, or relative). The field value would preferably already have been retrieved into an ET_DataRef buffer. In the case of a pointer or handle reference, this function is trivial, in the case of a relative reference, the function would perform the following:

```
doff = TC_RefToDataOffset(aDataRef->
   relativeRef,TC_GetDataOffset(aCollection,0,0,anElem));
    TC_ReadData(aCollection,0,doff,0,&cp,0);
   return cp;
```

A function that may also be included in the API, hereinafter referred to as TC_GetCStringRefFieldPtr( ), which could be provided in order to obtain the C string corresponding to a reference field (either pointer, handle, or relative). The field value would preferably already have been retrieved into an ET_DataRef buffer. In the case of a pointer or handle reference, this function is trivial, in the case of a relative reference, the function would perform the following:
  doff=TC_RefToDataOffset(aDataRef->relativeRef,
    TC_GetDataOffset(aCollection,0,0anElem);
  TC_ReadData(aCollection,0,doff,0,&cp,0);
  return cp:

A function that may also be included in the API, hereinafter referred to as TC_SetCStringFieldValue( ), which could be provided in order to set the C string field of a field within the specified collection element. Ideally, this function would also transparently handle all logic for the various allowable C-string fields as follows:
  1) if the field is a charHdl then:
    a) if the field already contains a value, update/grow the existing handle to hold the new value
    b) otherwise allocate a handle and assign it to the field
  2) if the field is a charPtr then:
    a) if the field already contains a value:
      i) if the previous string is equal to or longer than the new one, copy new string into existing pointer
      ii) otherwise dispose of previous pointer, allocate a new one and assign it
    b) otherwise allocate a pointer and assign it to the field
  3) if the field is a relative reference then:
    a) if the reference already exists, update its contents to hold the new string
    b) otherwise create a new copy of the string in the collection and reference the field to it
  4) if the field is an array of char then:
    a) if the new value does not fit, report array bounds error
    b) otherwise copy the value into the array A function that may also be included in the API, hereinafter referred to as TC_AssignToField( ), could be provided in order to assign an arbitrary field within a collection element to a value expressed as a C string. If the target field is a C string of some type, this function behaves similarly to TC_SetCStringFieldValue( ) except that if the 'kAppendStringValue' option is set, the new string is appended to the existing field contents. In all other cases, the field value would preferably be expressed in a format compatible with TM_StringToBinary( ) for the field type concerned and is assigned.

A function that may also be included in the API, hereinafter referred to as TC_GetValue( ), which could be provided in order to get the value and type ID of a designated collection element.

A function that may also be included in the API, hereinafter referred to as TC_GetTypeID( ), could be provided in order to return the type ID of a designated collection element. This function is only a convenience over TC_GetValue( ) in that the type is returned as a function return value (0 is returned if an error occurs)

A function that may also be included in the API, hereinafter referred to as TC_HasValue( ), could be provided in order to determine if a given node in a collection has a value or not. Again, the function would return either a positive or negative indicator in response to such a request.

A function that may also be included in the API, hereinafter referred to as TC_RemoveValue( ), could be provided in iorder to remove the value (if any) from a collection node.

A function that may also be included in the API, hereinafter referred to as TC_GetFieldValue( ), could be provided in order to get the value of a field within the specified collection element.

A function that may also be included in the API, hereinafter referred to as TC_GetCStringFieldValue( ), could be provided in order to get a C string field from a collection element into an existing buffer. In the preferred embodiment, if the field type is not appropriate for a C string, this function returns FALSE and the output buffer is empty. Preferably, if the field specified is actually some kind of reference to a C string, this function will automatically resolve the reference and return the resolved string. In the case of a persistent (#) reference, this function would preferably return the name field or the contents of the string handle field if non-NULL. In the case of a collection (@@) reference, this function will preferably return the contents of the string handle field if non-NULL.

A function that may also be included in the API, hereinafter referred to as TC_GetFieldPersistentElement( ), could be provided in order to obtain the element designator corresponding to a persistent reference field. In the preferred embodiment of this function, if the field value has not yet been obtained, this function will invoke a script which causes the referenced value to be fetched from storage and inserted into the collection at the end of a list whose parent is named by the referenced type and is immediately below the root of the collection (treated as a set). Thus, if the referenced type is "Person", then the value will be inserted below "Person" in the collection.

A function that may also be included in the API, hereinafter referred to as TC_GetFieldCollection( ), could be provided in order to obtain the collection offset corresponding to the root node of a collection reference. In the preferred embodiment, if the field collection value has not yet been obtained, this function will invoke a script for the field which causes the referenced values to be fetched from storage and inserted into the referencing collection as a separate and distinct collection within the same collection handle. The collection and element reference of the root node of this collection is returned via the 'collectionRef' parameter.

A function that may also be included in the API, hereinafter referred to as TC_GetPersistentFieldDomain( ), could be provided in order to obtain the collection offset corresponding to the root node of a domain collection for a persistent reference field. If the field domain collection value has not yet been obtained, this function will invoke a script, such as the "$GetPersistentCollection" script, for the field which causes the referenced values to be fetched from storage and inserted into the referencing collection as a separate and distinct collection within the same collection handle. The collection and element reference of the root node of this domain collection is returned via the 'collectionRef' parameter.

A function that may also be included in the API, hereinafter referred to as TC_SetFieldDirty( ), could be provided in order to mark the designated field of the collection element as either 'dirty' (i.e., changed) or clean. By default, all fields start out as being 'clean'. In the preferred embodiment, this function has no effect if a previous call to TC_InitDirtyFlags( ) has not been made in order to enable tracking of clean/dirty for the collection element concerned. Preferably, once a call to TC_InitDirtyFlags( ) has been made, subsequent calls to set the field value (e.g., TC_SetFieldValue) will automatically update the 'dirty' bit so that it in not necessary to call TC_SetFieldDirty( ) explicitly.

A function that may also be included in the API, hereinafter referred to as TC_IsFieldDirty( ), which could be provided in order to return the dirty/clean status of the specified field of a collection element. If dirty/clean tracking of the element has not been enabled using TC_InitDirtyFlags( ), this function returns FALSE.

A function that may also be included in the API, hereinafter referred to as TC_InitDirtyFlags( ), which could be provided in order to set up a designated collection element to track dirty/clean status of the fields within the element. By default, dirty/clean tracking of collection elements is turned off and a call to TC_IsFieldDirty( ) will return FALSE.

A function that may also be included in the API, hereinafter referred to as TC_SetFieldEmpty( ), which could be provided in order to mark the designated field of the collection element as either 'empty' (i.e., value undefined) or non-empty (i.e., value defined). By default all fields start out as being non-empty. In the preferred embodiment, this function has no effect if a previous call to TC_InitEmptyFlags( ) has not been made in order to enable tracking of defined/undefined values for the collection element concerned. Once a call to TC_InitEmptyFlags( ) has been made, subsequent calls to set the field value (e.g., TC_SetFieldValue) will automatically update the 'empty' bit so that it in not necessary to call TC_SetFieldEmpty( ) explicitly.

A function that may also be included in the API, hereinafter referred to as TC_EstablishEmptyDirtyState( ), which could be provided in order to calculate a valid initial empty/dirty settings for the fields of an element. In the preferred embodiment, the calculation would be performed based on a comparison of the binary value of each field with 0. If the field's binary value is 0, then it is assumed the field is empty and not dirty. Otherwise, the field is assumed to be not empty and dirty. If the element already has empty/dirty tracking set up, this function simply returns without modifying anything.

A function that may also be included in the API, hereinafter referred to as TC_IsFieldEmpty( ), which could be provided in order to return the empty/full status of the specified field of a collection element. If empty/full tracking of the element has not been enabled using TC_InitEmptyFlags( ), this function will return FALSE.

A function that may also be included in the API, hereinafter referred to as TC_SetElementTag( ), could be provided in order to add, remove, or replace the existing tag associated with a field of a 'valued' element within a collection, or alternatively if 'aFieldName' is NULL, the tag is associated with the element itself. Unlike annotations and scripts (see the TypeScripts package) that are applied to the definitions of the type or field, tags are associated with node a collection, normally (but not necessarily) a valued node. Tags consist of arbitrary strings, much like annotations. There may be any number of different tags associated with a given record/field. In the preferred embodiment, if the collection concerned is file or server-based, tags will persist from one run to the next and thus form a convenient method of arbitrarily annotating data stored in a collection without formally changing its structure. Tags may also be used extensively to store temporary data/state information associated with collections.

A function that may also be included in the API, hereinafter referred to as TC_GetElementTag( ), which could be provided in order to obtain the tag text associated with a given field within a 'valued' collection element. If the tag name cannot be matched, NULL is returned.

A function that may also be included in the API, hereinafter referred to as TC_SetElementNumericTag( ), which could be provided in order to add, remove, or replace the existing numeric tag associated with a field of a 'valued' element within a collection, or alternatively if 'aFieldName' is NULL; the tag is associated with the element itself (which may have no value). This would provide a shorthand method for accessing numeric tags and uses TC_SetElementTag( ). The 'tagFormat' value would preferably be one of the following predefined tag formats: 'kTagIsInteger','kTagIsIntegerList','kTagIsReal', or 'kTagIsRealList'. In the case of integer tags, the ellipses parameter(s) should be a series 'valueCount' 64-bit integers. In the case of real tags, the ellipses parameter(s) should be a series of 'valueCount' doubles.

A function that may also be included in the API, hereinafter referred to as TC_SetElementTypedTag( ), which could be provided in order to add, remove, or replace the existing typed tag associated with a field of a 'valued' element within a collection, or alternatively if 'aFieldName' is NULL, the tag is associated with the element itself (which may have no value). This function provides a shorthand method for accessing typed tags and uses TC_SetElementTag( ). The tag format is set to 'kTagIsTyped'. Preferably, the tag string itself consists of a line containing the type name followed by the type value expressed as a string using TM_BinaryToString ( . . . , kUnsignedAsHex+kCharArrayAsString).

A function that may also be included in the API, hereinafter referred to as TC_GetElementNumericTag( ), which could be provided in order to obtain the existing numeric tag associated with a field of a 'valued' element within a collection, or alternatively if 'aFieldName' is NULL, the tag is associated with the element itself (which may have no value). This provides a shorthand method for accessing numeric tags and uses TC_GetElementTag( ). The 'tagFormat' value would preferably be one of the following predefined tag formats: 'kTagIsInteger','kTagIsIntegerList', 'kTagIsReal', or 'kTagIsRealList'. In the case of integer tags, the ellipses parameter(s) would be a series 'valueCount' 64-bit integer addresses. In the case of real tags, the ellipses parameter(s) would be a series of 'valueCount' double addresses.

A function that may also be included in the API, hereinafter referred to as TC_GetElementTypedTag( ), which could be provided in order to obtain the existing typed tag associated with a field of a 'valued' element within a collection, or alternatively if 'aFieldName' is NULL, the tag is associated with the element itself (which may have no value). This provides a shorthand method for accessing numeric tags and uses TC_GetElementTag( ).

A function that may also be included in the API, hereinafter referred to as TC_GetElementTagList( ), which could be provided in order to obtain a string handle containing an alphabetized list (one per line) of all element tags appearing in or below a given node within a collection.

A function that may also be included in the API, hereinafter referred to as TC_GetAllElementTags( ), which could be provided in order to obtain a character handle containing all element tags associated with a specified element [and field] of a collection. This function may be used to optimize a series of calls to TC_GetElementTag( ) by passing 'aCollection' is NULL to TC_GetElementTag( ) and passing an additional 'charHdl' parameter that is the result of the TC_GetAllElementTags( ) call. This can make a significant difference in cases where a series of different tags need to be examined in succession.

A function that may also be included in the API, hereinafter referred to as TC_InitEmptyFlags( ), which could be provided in order to set up a designated collection element to track empty/full status of the fields within the element. By default, empty/full tracking of collection elements is turned off and a call to TC_IsFieldEmpty( ) will return FALSE if the field value is non-zero, the function will return TRUE otherwise.

A function that may also be included in the API, hereinafter referred to as TC_ShiftTail( ), which could be provided in order to make the designated element the new tail element of the collection and preferably discards all elements that were after the designated element.

A function that may also be included in the API, hereinafter referred to as TC_ShiftHead( ), which could be provided in order to make the designated element the new head element of the collection and preferably discards all elements that were before the designated element.

A function that may also be included in the API, hereinafter referred to as TC_RotTail( ), which could be provided in order to make the designated element the new tail element of the collection by rotating the collection without discarding any other elements. The rotation operation is usually applied to 'Ring' structures.

A function that may also be included in the API, hereinafter referred to as TC_RotHead( ), which could be provided in order to make the designated element the new head element of the collection by rotating the collection without discarding any other elements.

A function that may also be included in the API, hereinafter referred to as TC_SetName( ), which could be provided in order to assign a name to any member element of a collection. In the preferred embodiment, the element may subsequently be accessed using its name (which would preferably be unique). In essence, this is the basic operation of the 'kFromSet' collection, however, it can be applied and used for any of the other collection types. In the case of a tree element, the name specified would be the name of that node, however, to use the name to access the element using TC_SymbolicRef( ), it is preferable to specify the entire 'path' from the root node where each ancestor is separated from the next by a ':'. Alternatively, the 'kPathRelativeToParent' option can be used to allow the use of partial relative paths. Preferably, names would consist of alphanumeric characters or the '_' character only, and would be less than 31 characters long.

A function that may also be included in the API, hereinafter referred to as TC_GetName( ), which could be provided in order to return the name (if any) of the specified element of a collection. Note that in the case of a tree, the name would refer just to the local node. Preferably, to access the element symbolically, the path which can be obtained using TC_GetPath( ) would be used. The 'aName' buffer should be at least 32 characters long.

A function that may also be included in the API, hereinafter referred to as TC_GetPath( ), which could be provided in order to apply return the full symbolic path (if defined) from the root node to the specified element of a collection in a tree. Preferably, the 'aPath' buffer should be large enough to hold the entire path. The worst case can be calculated using TC_GetDepth( ) and multiplying by 32.

A function that may also be included in the API, hereinafter referred to as TC_SymbolicRef( ), which could be provided in order to obtain a reference to a given element of a collection given its name (see TC_SetName) or in the case of a tree, its full path. Sometimes for certain collections it is more convenient (and often faster) to refer to elements by name rather than any inherent order that they might have. This is the central concept behind the 'kFromSet' collection, however, it may also be applied to any other collection type. An element could also be found via its relative path from some other non-root node in the collection using this call simply by specifying the 'kPathRelativeToParent' which causes 'theParentRef', not the collection root, to be treated as the starting point for the relative path 'aName'.

A function that may also be included in the API, hereinafter referred to as TC_Find( ), which could be provided in order to scan the collection in order by calling the searching function specified in the comparison function parameter. In the preferred embodiment, the comparison function is passed two references, the second is to a record of type 'ET_ComplexSort' which is identical to that used during the TC_Sort( ) call. The first reference would be to a 'srchSpec' parameter. The 'srchSpec' parameter may be the address of any arbitrary structure necessary to specify to the search function how it is to do its search. The 'fromWhich' field of the 'ET_ComplexSort' record will be non-zero if the call relates to a non-leaf node (for example in a tree). The 'kRecursiveOperation' applies for hierarchical collections. The role of the search function is similar to that of the sort function used for TC_Sort( ) calls, that is it returns a result that is above, below, or equal to zero based on comparing the information specified in the 'srchSpec' parameter with that in the 'ET_ComplexSort' parameter. By repeatedly calling this function, one can find all elements in the collection that match a specific condition. In the preferred embodiment, when the 'kRecursiveOperation' option is set, the hits will be returned for the entire tree below the parent node specified according to the the search order used internally by this function. Alternatively, the relevant node could be specified as the parent (not the root node) in order to restrict the search to some portion of a tree.

A function that may also be included in the API, hereinafter referred to as, TC_FindByID( ), which could be provided in order to use the TC_Find( ) to locate a record within the designated portion of a collection having data whose unique ID field matches the value specified. This function could form the basis of database-like behavior for collections.

A function that may also be included in the API, hereinafter referred to as TC_FindByTag( ), which could be provided in order to make use of TC_Visit( ) to locate a record within (i.e., excluding the parent node) the designated portion of a collection whose tag matches the value specified.

A function that may also be included in the API, hereinafter referred to as TC_FindNextMatchingFlags( ), which could be provided in order to make use of TC_Visit( ) to locate a record within (i.e., excluding the parent/root node) the designated portion of a collection whose flags values match the flag values specified.

A function that may also be included in the API, hereinafter referred to as TC_FindByTypeAndFieldMatch( ), which could be provided in order to make use of TC_Find( ) to locate a record(s) within the designated portion of a collection having data whose type ID matches 'aTypeID' and for which the 'aFieldName' value matches that referenced by 'matchValue'. This is an optimized and specialized form of the general capability provided by TC_Search( ). Preferably, in the case of string fields, a "strcmp( )" comparison is used rather than the full binary equality comparison "memcmp( )" utilized for all other field types. For any more complex search purpose it is preferable to use TC_Search( ) directly. Persistent reference fields may also be compared by ID if possible or name otherwise. For Pointer, Handle, and Relative reference fields, the comparison is performed on the referenced value, not on the field itself. This approach makes it very easy to compare any single field type for an arbitrary condition without having to resort to more sophisticated use of TC_Find( ). In cases where more than one field of a type would preferably be examined to determine a match, particularly when the algorithm required may vary depending on the ontological type involved, the routine TC_FindByTypeAndRecordMatch( ) could be used.

A function that may also be included in the API, hereinafter referred to as TC_FindMatchingElements( ), which could be provided in order to make use of TC_Find( ) to locate a record(s) within the designated portion of a collection having data for which the various fields of the record can be used in a custom manner to determine if the two records refer to the same thing. This routine operates by invoking the script $ElementMatch when it finds potentially matching records, this script can be registered with the ontology and the algorithms involved may thus vary from one type to the next. This function may be used when trying to determine if two records relate to the same item, for example when comparing people one might take account of where they live, their age or any other field that can be used to discriminate including photographs if available. In the preferred embodiment, the operation of the system is predicated on the application code registering comparison scripts that can be invoked via this function. The comparison scripts for other types would necessarily be different.

A function that may also be included in the API, hereinafter referred to as TC_GetUniqueID( ), which could be provided in order to get the unique persistent ID value associated with the data of an element of a collection.

A function that may also be included in the API, hereinafter referred to as TC_SetUniqueID( ), which could be provided in order to set the unique persistent ID value associated with the data of an element of a collection.

A function that may also be included in the API, hereinafter referred to as TC_SetElementDestructor( ), which could be provided in order to set a destructor function to be called during collection tear-down for a given element in a collection. This function would preferably only be used if disposal of the element cannot be handled automatically via the type manager facilities. The destructor function is called before and built-in destructor actions, so if it disposes of memory associated with the element, it would preferably ensure that it alters the element value to reflect this fact so that the built-in destruction process does not duplicate its actions.

A function that may also be included in the API, hereinafter referred to as TC_GetElementDestructor( ), which could be provided in order to get an element's destructor function (if any).

A function that may also be included in the API, hereinafter referred to as TC_GetDepth( ), which could be provided in order to return the relative ancestry depth of two elements of a collection. That is if the specified element is an immediate child of the parent, its depth is 1, a grandchild (for trees) is 2 etc. If the element is not a child of the parent, zero is returned.

A function that may also be included in the API, hereinafter referred to as TC_Prune( ), which could be provided in order to remove all children from a collection. Any handle storage associated with elements being removed would preferably be disposed.

A function that may also be included in the API, hereinafter referred to as TC_AddPath( ), which could be provided in order to add the specified path to a tree. In the preferred embodiment, a path is a series of ':' separated alphanumeric (plus '_') names representing the nodes between the designated parent and the terminal node given. If the path ends in a ':', the terminal node is a non-leaf node, otherwise it is assumed to be a leaf. For example the path "animals: mammals:dogs:fido" would create whatever tree structure was necessary to insert the non-leaf nodes for "animals", "mammals" and "dogs" below the designated parent, and then insert the leaf node "fido" into "dogs". Note that while the parent is normally the root of the tree, another existing non-leaf node of the tree may be specified along with a path relative to that node for the add.

A function that may also be included in the API, hereinafter referred to as TC_Shove( ), which could be provided in order to add a new element at the start of the collection. When applied to a tree, a new head child node is added. When applied to a binary tree, it is preferable to use TC_AddLeft( ).

A function that may also be included in the API, hereinafter referred to as TC_Flip( ), which could be provided in order to reverse the order of all children of the specified parent. The 'kRecursiveOperation' option may also apply.

A function that may also be included in the API, hereinafter referred to as TC_SetFlags( ), which could be provided in order to set or clear one or more of the 16 custom flag values associated with each element of a collection. These flags are often useful for indicating logical conditions or states associated with the element.

A function that may also be included in the API, hereinafter referred to as TC_GetFlags( ), which could be provided in order to get one or more custom flag values associated with each element of a collection.

A function that may also be included in the API, hereinafter referred to as TC_SetReadOnly( ), which could be provided in order to alter the read-only state of a given element of a collection. If an element is read-only, any subsequent attempt to alter its value will fail.

A function that may also be included in the API, hereinafter referred to as TC_IsReadOnly( ), which could be provided in order to determine if a given element of a collection is marked as read-only or not. If an element is read-only, any attempt to alter its value will fail.

A function that may also be included in the API, hereinafter referred to as TC_SetTag( ), which could be provided in order to set the tag value associated with a given element. The tag value (which is a long value) may also be used to store any arbitrary information, including a reference to other storage. In the preferred embodiment, if the tag value represented other storage, it is important to define a cleanup routine for the collection that will be called as the element is destroyed in order to clean up the storage.

A function that may also be included in the API, hereinafter referred to as TC_GetTag( ), which could be provided in order to get the tag value associated with an element of a collection.

A function that may also be included in the API, hereinafter referred to as TC_SetShortCut( ), which could be provided in order to set the shortcut value associated with a given element.

A function that may also be included in the API, hereinafter referred to as TC_SetDescription( ), which could be provided in order to set the description string associated with a given element. The description may also be used to store any arbitrary text information.

A function that may also be included in the API, hereinafter referred to as TC_GetDescription( ), which could be provided in order to get the tag value associated with an element of a collection.

A function that may also be included in the API, hereinafter referred to as TC_CollType( ), which could be provided in order to obtain the collection type (e.g., kFromArray etc.) for a collection A function that may also be included in the API, hereinafter referred to as TC_Visit( ), which could be provided in order to visit each element of a collection in turn. For non-hierarchical collections, this function would be a relatively simple operation. For trees, however, the sequence of nodes visited would need to be set using a variable, such as 'postOrder'. In the preferred embodiment, if 'postOrder' is false, the tree is searched in pre-order sequence (visit the parent, then the children). If it is true, the search would be conducted in post-order sequence (visit the children, then the parent). At each stage in the 'walk', the previous value of 'anElem' could be used by the search to pick up where it left off. To start the 'walk', the variable 'anElem' could be set to zero. The 'walk' would terminate when this function returns FALSE and the value of anElem on output becomes zero. The advantage of using TC_Visit( ) for all collection scans, regardless of hierarchy, is that the same loop will work with hierarchical or non-hierarchical collections. Loops involving operations like TC_Next( ) do not in general exhibit this flexibility. If the 'kRecursiveOperation' option is not set, the specified layer of any tree collection will be traversed as if it was not hierarchical. This algorithm is fundamental to almost all other collection manipulations, and because it is non-trivial, it is further detailed below:

| | | | |
|---|---|---|---|
| Boolean TC_Visit | ( | | // Visit each element of a collection |
| | ET_CollectionHdl | aCollection, | // IO : The collection |
| | int32 | options, | // I : Various logical options |
| | ET_Offset | theParentRef, | // I : Parent element |

-continued

```
reference
            ET_Offset*          anElem,         // IO : Previous element (or 0), next
            Boolean             postOrder       // I : TRUE/FALSE = postOrder/preOrder
                        )                       // R : TRUE for success, else FALSE
{
    off = *anElem;
    prt = resolve parent reference
    objT = root node 'fromWhich'
    if ( !off )
    {
        off = ( prtP->childHdr) ? theParentRef + prtP->childHdr : 0;
        if ( off )
        {
            cpxP = resolve off reference
            if ( post && (options & kRecursiveOperation) )
                while ( off && cpxP->childHdr )             // now dive down to any children
                {
                    off = off + cpxP->childHdr;
                    cpxP = resolve off reference
                }
        }
    } else
    {
        cpxP = resolve off reference
        noskip = NO;
        if ( post )                                         // post-order traversal
        {                                                   // at the EOF so only if we're in
            if ( !cpxP->nextElem && (options & kRecursiveOperation) )
            {                                               // a hierarchy may there be more
                if ( objT == kFromBTree || objT == kFromNTree || objT == kFromArrayN )
                {
                    if ( cpxP->hdr.parent )
                    {
                        off = off + cpxP->hdr.parent;       // climb up next parent
                        cpxP = resolve off reference
                        if ( ((cpxP != kComplexRecord || off == theParentRef ) )
                            off = 0;
                    } else
                            off = 0;
                    noskip = YES;                           // parents examined after children
                } else
                        off = 0;
            }
            if ( off && !noskip )
            {
                off = ( cpxP->nextElem ) ? off + cpxP->nextElem : 0;
                if ( off )
                {
                    cpxP = resolve off reference
                    if ( options & kRecursiveOperation )
                        while ( off && cpxP->childHdr)      // depth 1st dive to children
                        {
                            off = off + cpxP->childHdr;
                            cpxP = resolve off reference
                        }
                }
            }
        } else                                              // pre-order traversal
        {
            if ( cpxP->childHdr && (options & kRecursiveOperation) )
            {
                off = off + cpxP->childHdr;
                cpxP = resolve off reference
            } else
            {
                if ( cpxP->nextElem )
                {
                    off = off + cpxP->nextElem;
                    cpxP = resolve off reference
                }
```

-continued

```
                else if ( options & kRecursiveoperation )
                {
                    if ( objT == kFromBTree || objT == kFromNTree || objT ==
kFromArrayN )
                        for ( ; off && !cpxP->nextElem ; )
                        {
                            if ( cpxP->hdr.parent )
                            {
                                off = off + cpxP->hdr.parent;
                                cpxP = resolve off reference
                            } else
                                off = 0;
                            if ( off && (record != kComplexRecord || off ==
theParentRef) )
                                off = 0;
                            }
                            else
                                off = 0;
                            if ( off && cpxP->nextElem )
                            {
                                off = off + cpxP->nextElem;
                                cpxP = resolve off reference
                            }
                        } else
                            off = 0;
                    }
                }
            }
```

A function that may also be included in the API, hereinafter referred to as TC_Random( ), could be provided in order to randomize the order of all children of the specified parent. The 'kRecursiveOperation' option applies.

A function that may also be included in the API, hereinafter referred to as TC_HasEmptyFlags( ), could be provided in order to check to see if a designated collection element has tracking set up for empty/non-empty status of the fields within the element.

A function that may also be included in the API, hereinafter referred to as TC_HasDirtyFlags( ), could be provided in order to check to see if a designated collection element has tracking set up for dirty/clean status of the fields within the element.

A function that may also be included in the API, hereinafter referred to as TC_GetSetDirtyFlags( ), could be provided in order to get/set the dirty flags for a given record. This copy might also be used to initialize the flags for another record known to have a similar value. To prevent automatic re-computation of the flags when cloning is intended (since this computation is expensive), it is preferable to use the 'kNoEstablishFlags' option when creating the new record to which the flags will be copied. The buffer supplied in 'aFlagsBuffer' would preferably be large enough to hold all the resulting flags. The size in bytes necessary can be computed as:

bytes=(((TM_GetTypeMaxFlagIndex(         )-1)|0x07)+1)>> 3;

A function that may also be included in the API, hereinafter referred to as TC_GetSetEmptyFlags( ), could be provided in order to get/set the empty flags for a given record. For example, this copy might be used to initialize the flags for another record known to have a similar value. To prevent automatic re-computation of the flags in cases where such cloning is intended (since this computation Is expensive), it is preferably to use the 'kNoEstablishFlags' option when creating the new record to which the flags will be copied. The buffer supplied in 'aFlagsBuffer' would preferably be large enough to hold all the resulting flags. The size in bytes necessary can be computed as:

bytes=(((TM_GetTypeMaxFlagIndex(         )-1)|
    0x07)+1)>> 3;

A function that may also be included in the API, hereinafter referred to as TC_GetServerCollections( ), could be provided in order to obtain a string handle containing an alphabetized series of lines, wherein each line gives the name of a 'named' collection associated with the server specified. These names could be used to open a server-based collection at the client that is tied to a particular named collection in the list (see, for example, TC_OpenContainer).

A function that may also be included in the API, hereinafter referred to as TC_Publish( ), could be provided in order to publish all collections (wake function).

A function that may also be included in the API, hereinafter referred to as TC_UnPublish( ), could be provided in order to un-publish a previously published collection at a specified server thus making it no-longer available for client access. In the preferred embodiment, un-publishing first causes all current subscribers to be un-subscribed. If this process fails, the un-publish process itself is aborted. Once un-published, the collection is removed from the server and any subsequent (erroneous) attempt to access it will fail.

A function that may also be included in the API, hereinafter referred to as TC_Subscribe( ), could be provided in order to subscribe to a published collection at a specified server thus making accessible in the client. A similar effect could be achieved by using TC_CreateCollection( ) combined with the 'kServerBasedCollection' option.

A function that may also be included in the API, hereinafter referred to as TC_Unsubscribe( ), could be provided in order to un-subscribe from a published collection at a specified server. In the preferred embodiment, the collection itself does not go away in the server, un-subscribing merely removes the connection with the client.

A function that may also be included in the API, hereinafter referred to as TC_ContainsTypedef( ), could be provided in order to determine if a typedef for type name given is embedded in the collection. Because collections may be shared, and may contain types that are not known in other machines sharing the collection, such as proxy types that may have been created on the local machine, it is essential that the collection itself contain the necessary type definitions within it. In the preferred embodiment, this logic would be enforced automatically for any proxy type that is added into a collection. If a collection contains other dynamic types and may be shared, however, it is preferable to include the type definition in the collection.

A function that may also be included in the API, hereinafter referred to as TC_AddTypedef( ), could be provided in order to add/embed a typedef for type name in a collection. Because collections may be shared, and may contain types that are not known in other machines sharing the collection, such as proxy types that may have been created on the local machine, it is preferable for the collection itself to store the necessary type definitions within it. In the preferred embodiment, this logic would be enforced automatically for any proxy type that is added into a collection. If a collection contains other dynamic types and may be shared, however, is preferably to ensure that the type definition is included in the collection by calling this function.

A function that may also be included in the API, hereinafter referred to as TC_BuildTreeFromStrings( ), could be provided in order to create a tree collection and a set of hierarchical non-valued named nodes from a series of strings formatted as for TC_AddPath( ), one per line of input text. The root node itself may not be named. If a collection is passed in, the new collection could attached to the specified node. Alternatively, an entirely new collection could be created and returned with the specified tree starting at the root.

A function that may also be included in the API, hereinafter referred to as TC_RegisterServerCollection( ), could be provided in order to register a collection by name within a server for subsequent non-local access via a server using server-based collections in the clients.

A function that may also be included in the API, hereinafter referred to as TC_DeRegisterServerCollection( ), could be provided in order to deregister a collection by name to prevent subsequent accesses via TC_ResolveServerCollection( ).

One feature that is important in any complete data model is the ability to associate and execute arbitrary code or interpreted script routines whenever certain logical actions are performed on the data of one of its fields. In the system of this invention, this capability is provided by the 'scripts' API (prefix TS_) a portion of which could be implemented as set forth below:

```
Boolean TS_SetTypeAnnotation(              // Modify annotation for a
given type
        ET_TypeDBHdl          aTypeDBHdl,  // I : Type DB handle (NULL
to default)
        ET_TypeID             aTypeID,     // I : Type ID
        charPtr               name,        // I : Annotation name
"$anAnnotation"
        charPtr               annotation   // I : Annotation, NULL to
remove
                              );           // R : TRUE for success,
FALSE otherwise
Boolean TS_SetFieldAnnotation(             // Set field annotation
text
        ET_TypeDBHdl          aTypeDBHdl,  // I : Type DB handle (NULL
to default)
        ET_TypeID             aTypeID,     // I : Type ID
        charPtr               aFieldName,  // I : Name of the
field/field path
        charPtr               name,        // I : Annotation name as in
"<on> $name"
        charPtr               anAnnotation,// I : Text of annotation,
NULL to remove
        ...                                // I : 'fieldName' could be
sprintf( )
                              );           // R : TRUE for success,
FALSE otherwise
charHdl TS_GetTypeAnnotation(              // Obtain annotation for a
given type
        ET_TypeDBHdl          aTypeDBHdl,  // I : Type DB handle (NULL
to default)
        ET_TypeID             aTypeID,     // I : Type ID
        charPtr               name,        // I : Annotation name as in
"<on> $name"
        int32                 options,     // I : Various logical
options (see notes)
        ET_ViewRef            *collectionNode, // I : If non-NULL,
collection node
        ET_TypeID             *fromWho     // IO : holds registering
type ID
                              );           // R : Annotation text, NULL
if none
```

-continued

| | | |
|---|---|---|
| charHdl TS_GetFieldAnnotation( field | | // Get annotation for a |
| ET_TypeDBHdl aTypeDBHdl, to default) | | // I : Type DB handle (NULL |
| ET_TypeID | aTypeID, | // I : Type ID |
| charPtr field/field path | aFieldName, | // I : Name of the |
| int32 options (see notes) | options, | // I : Various logical |
| ET_ViewRef collection node | *collectionNode, | // I : If non-NULL, |
| ET_TypeID type ID | *fromWho, | // IO : holds registering |
| charPtr "<on> $name" | name, | // I : Annotation name as in |
| . . . sprintf( ) | | // I : 'fieldName' may be |
| ); if none | | // R : Annotation text, NULL |
| #define kNoInheritance ancest. types | 0x01000000 | // options - !inherit from |
| #define kNoRefInherit ref. fields | 0x02000000 | // options - !inherit for |
| #define kNoNodeInherit ancest. nodes | 0x08000000 | // options - !inherit from |
| charHdl TS_GetFieldScript ( field | | // Get script for action & |
| ET_TypeDBHdl to default) | aTypeDBHdl, | // I : Type DB handle (NULL |
| ET_TypeID | aTypeID, | // I : Type ID |
| charPtr field/field path | aFieldName, | // I : Name of the |
| charPtr "<on> anAction" | anAction, | // I : Action name as in |
| int32 options (see notes) | options, | // I : Various logical |
| ET_ViewRef collection node | *collectionNode, | // I : If non-NULL, |
| ET_TypeID | *fromWho, | // IO : registering type ID |
| Boolean script, else false | *isLocal, | // IO : TRUE if local |
| . . . sprintf( ) | | // I : 'aFieldName' may be |
| ); none | | // R : Action script, NULL if |
| #define kGlobalDefnOnly global def. | 0x04000000 | // options - only obtain |
| Boolean TS_SetTypeScript( type | | // Set script for action & |
| ET_TypeDBHdl to default) | aTypeDBHdl, | // I : Type DB handle (NULL |
| ET_TypeID | aTypeID, | // I : Type ID |
| charPtr "<on> anAction" | anAction, | // I : Action name as in |
| charPtr to remove | aScript, | // I : Type script/proc, NULL |
| int32 options (see notes) | options | // I : Various logical |
| ); FALSE otherwise | | // R : TRUE for success, |
| #define kLocalDefnOnly override | 0x00000001 | // options - local script |
| #define kprocNotScript fn. address | 0x00000002 | // options - 'aScript' is a |
| Boolean TS_SetFieldScript( | | // Set field action script |
| ET_TypeDBHdl to default) | aTypeDBHdl, | // I : Type DB handle (NULL |
| ET_TypeID | aTypeID, | // I : Type ID |
| charPtr field/field path | aFieldName, | // I : Name of the |
| charPtr "<on> anAction" | anAction, | // I : Selector name as in |
| charPtr NULL to remove | aScript, | // I : Field script/proc, |
| int32 options (see notes) | options, | // I : Various logical |
| . . . sprintf( ) | | // I : 'aFieldName' may be |
| ); | | // R : TRUE for success, |

| | | |
|---|---|---|
| FALSE otherwise | | |
| charHdl TS_GetTypeScript( action | | // Get type script for |
| ET_TypeDBHdl to default) | aTypeDBHdl, | // I : Type DB handle (NULL |
| ET_TypeID | aTypeID, | // I : Type ID |
| charPtr "<on> anAction" | anAction, | // I : Action name as in |
| int32 options (see notes) | options, | // I : Various logical |
| ET_ViewRef collection node | *collectionNode, | // I : If non-NULL, |
| ET_TypeID | *fromWho, | // IO : registering type ID |
| Boolean if local | *isLocal, | // IO : If non-NULL, set TRUE |
| ); none | | // R : Action script, NULL if |
| EngErr TS_InvokeScript ( action script | | // Invoke a type or field |
| ET_TypeDBHdl to default) | aTypeDBHdl, | // I : Type DB handle (NULL |
| ET_TypeID | aTypeID, | // I : Type ID |
| charPtr field/field path | aFieldName, | // I : Name of the |
| charPtr "<on> anAction" | anAction, | // I : Action name as in |
| charPtr to default | aScript, | // I : type/field script, NULL |
| ET_TypeID or 0 | fromWho, | // I : Registering Type id, |
| anonPtr NULL | aDataPtr, | // I : Type data buffer, or |
| ET_CollectionHdl or NULL | aCollection, | // I : The collection handle, |
| ET_Offset reference | offset, | // I : Collection element |
| int32 options | options, | // I : Various logical |
| ... parameters | | // IO : Additional 'anAction' |
| ); FALSE otherwise | | // R : Zero for success, |
| #define kSpecializedOptionsMask predefined | 0x0000FFFF | // other bits are |
| #define kInternalizeResults be embedded | 0x00010000 | // options - value should |
| Boolean TS_RegisterScriptFn( function | | // register a script |
| ET_TypeScriptFn function | aScriptFunction, | // I : address of script |
| charPtr function | aName, | // I : name of script |
| ); FALSE otherwise | | // R : TRUE for success, |

Every type or type field may also have 'action' scripts (or procedures) associated with it. For example, certain actions could be predefined to equate to standard events in the environment. Actions may also be arbitrarily extended and used as subroutines within other scripts, however, in order to provide a rich environment for describing all aspects of the behavior of a type or any UI associated with it. Such an approach would allow the contents of the type to be manipulated without needing any prior knowledge of the type itself. Type and Field script procedures could have the following calling API, for example (ET_TypeScriptFn):

| | | |
|---|---|---|
| EngErr myScript ( | | // my script procedure |
| ET_TypeDBHdl to | aTypeDBHdl, | // I:Type DB handle (NULL |
| default) | | |
| ET_TypeID | typeID, | // I:Type ID |
| charPtr NULL for type | fieldName, | // I:Field name/path, |
| charPtr invoked | action, | // I:The script action being |
| charPtr | script, | // I:The script text |
| anonPtr NULL | dataPtr, | // I:Type data pointer or |
| ET_CollectionHdl or NULL | aCollection, | // I:The collection handle, |
| ET_Offset reference | offset, | // I:Collection element |
| va_list params. | ap | // I:va_list to additional |
| ) | | // R:0 for success, else |
| Error number | | |

In the case of a script, these parameters can be referred to using $action, $aTypeDBHdl, $typeID, $fieldName and $dataPtr, any additional parameters are referred to by their names as defined in the script itself (the 'ap' parameter is not accessible from a script). Preferably, Scripts or script functions would return zero if successful, an error number otherwise. In the case of a C function implementing the script, the "ap" parameter can be used to obtain additional parameter values using va_arg( ). A number of script actions may also be predefined by the environment to allow registration of behaviors for commonly occurring actions. A sample set of predefined action scripts are listed below (only additional parameters are shown), but many other more specialized scripts may also be used:

$GetPersistentRef(ET_PersistentRef *persistentRef) Resolve a persistent reference, once the required data has been loaded (e.g., from a database), the 'memoryRef' or 'elementRef' field should be set to reference the element designator obtained. This corresponds to resolving the 'type-Name #id' persistent reference language construct. Note that if the 'id' field of the ET_PersistentRef is zero, the 'name' field will contain a string giving the name of the item required (presumably unique) which the function should then resolve to obtain and fill out the 'id' field, as well as the 'memory/element Ref' field. The contents of the 'stringH' field of 'persistentRef' may contain text extracted during data mining (or from other sources) and this may be useful in resolving the reference. The following options are defined for this script:

| | |
|---|---|
| kInternalizeResults | the resultant value should be created within the referencing collection |
| kGetNameOnly | Just fetch the name of the reference NOT the actual value |

$GetCollection(charPtr $filterSpec, charPtr fieldList, ET_CollectionRef *collectionRef) This script builds a type manager collection containing the appropriate elements given the parent type and field name. Once the collection has been built, the 'collection' field value of 'collectionRef' should be set equal to the collection handle (NULL if empty or problem creating it). This normally corresponds to resolving the 'typeName @@collectionName' collection reference language construct. The value of $filterSpec is obtained from the "$FilterSpec" annotation associated with the field (if any). Note also that the contents of the 'stringH' field of 'collectionRef' may also contain text extracted during data mining (or from other sources) and this may be useful in determining how to construct the collection. The value of the 'fieldList' parameter may be set to NULL in order to retrieve all fields of the elements fetched, otherwise it would preferably be a comma separated list of field names required in which case the resulting collection will be comprised of proxy types containing just the fields specified. The 'kInternalizeResults' option may apply to this script.

$GetPersistentCollection(charPtr $filterSpec, charPtr fieldList, ET_PersistentRef *persistentRef) This script/function is similar to "$GetCollection" but would be called only for persistent reference fields. The purpose of this script is to obtain a collection (into the 'members' field of the ET_PersistentRef) of the possible choices for the persistent reference. This can be seen in the UI when the field has a list selection menu next to it to allow setting of new values, clicking on this list selection will result in a call to this script in order to populate the resulting menu. "$filterSpec" and "fieldList" operate in a similar manner to that described for "$GetCollection". The 'kInternalizeResults' option may apply to this script.

$InstantiatePersistentRef(ET_PersistentRef *persistentRef) This script is called in order to instantiate into persistent storage (if necessary) a record for the persistent reference passed which contains a name but no ID. The script should check for the existence of the named Datum and create it if not found. In either case the ID field of the persistent reference should be updated to contain the reference ID. The actions necessary to instantiate values into persistent storage vary from one data type to another and hence different scripts may be registered for each data type. The 'stringH' field of the persistent reference may also contain additional information specific to the fields of the storage to be created. The $SetPersRefInfo( ) function can be used during mining to append to this field. Any string assignment to a persistent reference field during mining results in setting the name sub-field. In the preferred embodiment, this script would clear the 'stringH' field after successful instantiation.

$InstantiateCollection(ET_CollectionRef *collectionRef) This script is called in order to instantiate into persistent storage (if necessary) all records implied by the collection field passed. The process is similar to that for "$InstantiatePersistentRef" but the script would preferably be aware of the existence of the 'aStringH' field of the collection reference with may contain a text based list of the implied record names. Any string assignment to a collection field during mining results in appending to the 'stringH' field. This field could also be explicitly set using the $SetPersRefInfo( ) function. In the preferred embodiment, this script would clear the 'stringH' field after successful instantiation.

$DefaultValue(charPtr defaultValue) This script/function allows the default value of a type field to be set. If the field has a "$DefaultValue" annotation this is passed as a parameter to the function, otherwise this parameter is null. In the absence of a "$DefaultValue" script, any "$DefaultValue" annotation found will be passed to TM_StringToBinary (delimiter="\n") which can be used to initialize fields, including structures to any particular value required. The assignment of default values preferably occurs within calls to TM_NewPtr( ), TM_NewHdl( ), or TM_InitMem( ) so type memory would also be allocated using one of these functions if default values are being used. If no default value is specified, the memory is initialized to zero. A field may also be explicitly set to its default value by calling TM_SetFieldToDefault( ).

$Add( ) This script/function is invoked to add a typed record to persistent storage (i.e., database(s)). In most cases the record being added will be within a collection that has been extracted during mining or which has been created manually via operator input.

$UniqueID( ) This script is called to assign (or obtain) the unique ID for a given record prior to adding/updating that record (by invoking $Add) to the database. The purpose of this script it to examine the name field (and any other available fields) of the record to see if a record of the same type and name exists in storage and if it does fill out the ID field of the record, otherwise obtain and fill out a new unique ID. Since the ID field preferably serves as the link between all storage containers in the local system, it is essential that this field is set up prior to any container specific adds and prior to making any $MakeLink script (described below) calls.

$MakeLink(ET_CollectionHdl refCollection,ET_Offset refElement,charPtr refField) This script is called after $UniqueID and before $Add when processing data in a collection for addition/update to persistent storage. The purpose of this script is to set up whatever cross-referencing fields or hidden linkage table entries are necessary to make the link specified. If the referring field is a persistent reference, it will already have been set up to contain the ID and relative reference to the referred structure. If additional links are required (e.g., as implied by 'echo' fields), however, this script would be used to set them up prior the $Add being invoked for all Datums in the collection.

$SetFieldValue(anonPtr *newvalue,long *context,int32 entry) This script could called whenever the value of a field is altered. Normally setting a field value requires no script in order to implement, however, if a script is specified, it will be called immediately prior to actually copying the new value over with the value of 'entry' set to true. This means that the script could change the 'newValue' contents (or even replace it with a alternate 'newValue' pointer) prior to the copy. After the copy is complete and if 'context' is non-zero, the script may be called again with 'entry' set to false which allows any context stored via 'context' to be cleaned up (including restoring the original 'newValue' if appropriate). Because of this copying mechanism, $SetFieldValue scripts would preferably not alter the field value in the collection, but rather the value that is found in 'newValue'. This script is also a logical place to associate any user interface with the data underlying it so that updates to the UI occur automatically when the data is changed.

$Drag(ControlHandle aControlH,EventRecord *eventP, ETD_ragRef *dragRef) This script is called to start a drag.

$Drop(ControlHandle aControlH,ET_DragRef dragRef) This script is called to perform a drop. The options parameter will have bit-0 set true if the call is for a prospective drop, false if the user has actually performed a drop by releasing the mouse button. A prospective drop occurs if the user hovers over a potential drop location, in this case a popup menu may be automatically displayed in order to allow the user to select one of a set of possible drop actions (for example, "copy link", "insert icon" etc). This same menu may also be produced on an actual drop if it is not possible to determine automatically what action is required. The DragAndDrop implementation provides a set of API calls for constructing and handling the drop action menu, $ElementMatch(ET_Offset element,Boolean *match) This script is called to compare two elements to see if they refer to the same item. See TC_FindMatchingElements( ) for details. Preferably, the Boolean result is returned in the 'match' field, true to indicate a match and false otherwise.

Annotations are arbitrarily formatted chunks of text (delimited as for scripts and element tags) that can be associated with fields or types in order to store information for later retrieval from code or scripts. The present invention utilized certain predefined annotations (listed below) although additional (or fewer) annotations may also be defined as desired:

$filterSpec—This annotation (whose format is not necessarily currently defined by the environment itself) is passed to the $GetCollection and $GetPersistentCollection scripts in order to specify the parameters to be used when building the collection.

$tableSpec—This annotation (whose format is not necessarily currently defined by environment itself) is used when creating persistent type storage.

$DefaultValue—See the description under the $DefaultValue script.

$BitMask—This annotation may be used to define and then utilize bit masks associated with numeric types and numeric fields of structures. The format of the annotation determines the appearance in auto-generated UI. For full details, see the description for the function TM_GetTypeBitMaskAnnotation( ).

$ListSpec—In the preferred embodiment, this field annotation consists of a series of lines, each containing a field path within the target type for a collection reference. These field paths can be used to define the type and number of columns of a list control provided by the TypesUI API which will be used to display the collection in the UI. The elements of the $ListSpec list would preferably correspond to valid field paths in the target type.

A function, hereinafter called TS_SetTypeAnnotation( ), could be provided which adds, removes, or replaces the existing "on" condition annotation for a type. This routine may also be used to add additional annotations to or modify existing annotations of a type.

A function, hereinafter called TS_SetFieldAnnotation( ), could be provided which adds, removes, or replaces the existing annotation associated with a field. This routine may also be used to add additional annotations to or modify existing annotations of a type field. Preferably, annotations always apply globally. In such an embodiment, annotations could be divided into annotation types so that multiple independent annotations can be attached and retrieved from a given field.

A function, hereinafter called TS_GetTypeAnnotation( ), could be provided which obtains the annotation specified for the given type (if any). In the preferred embodiment, the following options are supported:

kNoInheritance—don't inherit from ancestral types etc.

kNoNodeInherit—don't inherit from ancestral nodes in the collection

A function, hereinafter called TS_GetFieldAnnotation( ), could be provided which obtains the annotation text associated with a given field and annotation type. If the annotation and annotation type cannot be matched, NULL is returned. In the preferred embodiment, options include:

kNoInheritance—don't inherit from ancestral types etc.

kNoNodeInherit—don't inherit from ancestral nodes in the collection kNoRefInherit—don't inherit for reference fields A function, hereinafter called TS_GetFieldScript( ), could be provided which obtains the script associated with a given field and action. If the script and action cannot be matched, NULL is returned. Preferably, the returned result would be suitable for input to the function TS_DoFieldActionScript( ). Note that field scripts may be overridden locally to the process using TS_SetFieldScript( ). If this is the case, the 'isLocal' parameter (if specified) will be set true. Local override scripts that wish to execute the global script and modify the behavior may also obtain the global script using this function with 'globalDefnOnly' set TRUE, and execute it using TS_DoFieldActionScript( ). If the script return actually corresponds to an action procedure not a script then the script contents will simply contain an '=' character followed by a single hex number which is the address of the procedure to be called. This is also valid input to TS_DoFieldActionScript( ) which will invoke the procedure. If the 'Inherit' parameter is TRUE, upon failing to find a script specific to the specified field, this function will attempt to find a script of the same name associated with the enclosing type (see TM_GetTypeActionScript) or any of its ancestors. This means that it is possible to specify default behaviors for all fields derived from a given type in one place only and then only override the default in the case of specific field where this is necessary. If the field is a reference field, a script is only invoked if it is directly applied to the field itself, all other script inheritance is suppressed. In the preferred embodiment, the following options would be supported:

kNoInheritance—don't inherit from ancestral types etc.
   kNoNodeInherit—don't inherit from ancestral nodes in the collection
   kNoRefInherit—don't inherit for reference fields
   kGlobalDefnOnly—only obtain global definition, ignore local overrides The search order when looking for field scripts is as follows:

1) Look for a field script associated, with the field itself.
2) If 'inherit' is TRUE:
   A) If 'aFieldName' is a path (e.g., field1.field2.field3), for each and every ancestral field in turn (from the leaf node upwards—2,1 in the example above):
      a) If there is an explicit matching field script (no-inheritance) associated with that field, use it
   B) If the field is a 'reference' field (i.e., *,**,@,@@, or #), search the referred to type for a matching type script
   C) Search the enclosing type ('aTypeID') for a matching type script.

A function, hereinafter called TS_SetTypeScript( ), could be provided which adds, removes, to or replaces the existing "on" condition action code within an existing type script. For example, this routine could be used to add additional behaviors to or modify existing behaviors of a type. In the preferred embodiment, if the 'kLocalDefnOnly' option is set, the new action script definition applies within the scope of the current process but does not in any way modify the global definition of the type script. The ability to locally override a type action script is very useful in modifying the behavior of certain portions of the UI associated with a type while leaving all other behaviors unchanged. If the 'kProcNotScript' option is set, 'aScript' is taken to be the address of a procedure to invoke when the script is triggered, rather than a type manager script. This approach allows arbitrary code functionality to be tied to types and type fields. While the use of scripts is more visible and flexible, for certain specialized behaviors, the use of procedures is more appropriate.

A function, hereinafter called TS_SetFieldScript( ), could be provided which adds, removes, or replaces the existing "on" condition action code within an existing field script. For example, this routine may be used to add additional behaviors to or modify existing behaviors of a type field. If the 'kLocalDefnOnly' option is set, the new action script definition applies within the scope of the current process, it does not in any way modify the global definition of the field's script. As explained above, this ability to locally override a field action script is very useful in modifying the behavior of certain portions of the UI associated with a field while leaving all other behaviors unchanged. If the 'kProcNotScript' option is set, 'aScript' is taken to be the name of a script function to invoke when the script is triggered, rather than an actual type manager script. This allows arbitrary code functionality to be tied to types and type fields. Script functions can be registered using TS_RegisterScriptFn( ).

A function, hereinafter called TS_GetTypeScript( ), could be provided which obtains the script associated with a given type and action. If the type and action cannot be matched, NULL is returned. Preferably, the returned result would be suitable for input to the function TS_DoTypeActionScript( ). Note that in the preferred embodiment type scripts may be overridden locally to the process using TS_SetTypeScript( ). If this is the case, the 'isLocal' parameter (if specified) will be set true. Local override scripts that wish to execute the global script and modify the behavior somehow can obtain the global script using this function with 'kGlobalDefnOnly' option set, and execute it using TS_DoTypeActionScript( ). If the script return actually corresponds to an action procedure not a script then the script contents will simply contain an '=' character followed by a single hex number which is the address of the procedure to be called. This is also valid input to TS_DoTypeActionScript( ) which will invoke the procedure. If the 'kNoInheritance' option is not set, upon failing to find a script specific to the type, this function will attempt to find a script of the same name associated with the enclosing type or any of its ancestors. Using this function, it is possible to specify default behaviors for all types (and fields—see TM_GetFieldActionScript) derived from a given type in one place only and then only override the default in the case of specific type/field where this is necessary. Options for this function are identical as described with respect to the function TS_GetFieldScript( ).

A function, hereinafter called TS_InvokeScript( ), could be provided which invokes the specified field action script or script function. Note that because the 'fieldScript' parameter is explicitly passed to this function, it is possible to execute arbitrary scripts on a field even if those scripts are not the script actually associated with the field (as returned by TS_GetFieldScript). This capability makes the full power of the type scripting language available to program code whilst allowing arbitrary script or script function extensions as desired. Unlike most field related functions in this API, this function does not necessarily support sprintf( ) type field expansion because the variable arguments are used to pass parameters to the scripts. When invoking a type action script without knowledge of the field involved, the 'aFieldName' parameter should be set to NULL.

A function, hereinafter called function TS_RegisterScriptFn( ); could also be provided which could be used to register a script function symbolically so that it can be invoked if encountered within a field or type script. In the preferred embodiment, when TS_InvokeFieldActionScript( ) encounters a script beginning with an '=' character and of the form "=scriptFnName" where "scriptFnName" has been registered previously using this procedure, it resolves "scriptFnName" to obtain the actual function address and then invokes the function.

The foregoing description of the preferred embodiments of the invention has been presented for the purposes of illustration and description. For example, although described with respect to the C programming language, any programming language could be used to implement this invention. Additionally, the claimed system and method should not be limited to the particular API disclosed. The descriptions of the header structures should also not be limited to the embodiments described. While the sample pseudo code provides examples of the code that may be used, the plurality of implementations that could in fact be developed is nearly limitless. For these reasons, this description is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A system for the creation, manipulation, persistence, and networked sharing of collections of strongly typed binary information comprising:
   a processor;
   logically connected to said processor, a one or more databases, wherein said one or more databases via an application programming interface store arbitrarily complex structures and cross references between said structures instantiated within a single contiguous allocation memory model and contains only internal relative memory references to said structures which allows operations involving said structures to be transparently echoed to/from a file or network server based persistent storage, wherein each of an alternative persistent storage mechanism constitutes one of a plurality of containers registered with said application programming interface;
   logically connected to said processor, a run-time type system capable of manipulating strongly typed binary information with which said processor defines and accesses the strongly typed binary information;
   logically connected to said processor, a client-server environment, wherein said client-server environment interprets the strongly typed binary information defined by said run-time type system;
   logically connected to said processor and contained entirely within any instance of said one or more databases, and manipulated via said application programming interface, a one or more data aggregation structures, wherein said one or more data aggreiation structures include 'parent', 'child' and 'sibling' links; and
   logically connected to said processor, a one or more data attachment structures to which the strongly typed binary information defined by said run-time type system is attached and which is associated with said one or more data aggregation structures.

2. The system of claim 1, further comprising an API, logically connected to said client-server environment, wherein said API provides one or more functions for interpreting and executing manipulations on said data aggregation structures remotely.

3. The system of claim 2, wherein said API includes one or more functions capable of internalizing a non-memory based storage container to memory.

4. The system of claim 3, wherein said API includes one or more functions capable of automatically echoing all write actions performed on a memory based storage container that has been internalized to a corresponding external storage container.

5. The system of claim 3, said system further comprising a publishing system, wherein said publishing system is capable of publishing one or more data collections thereby permitting access to said data collections to one or more authorized clients in a distributed network environment.

6. The system of claim 5, wherein said publishing system is capable of storing client subscription information relating to said one or more data collections.

7. The system of claim 6, further comprising a notification system, logically connected to said publishing system, wherein said notification system uses said client subscription information to notify said one or more clients when changes are occurring to a server-based collection to which they are subscribers.

8. The system of claim 7, wherein said publishing system is capable of transparently affecting changes requested by said one or more clients that are subscribed to said data collections thereby facilitating automatic data collaborations between disparate nodes on the network.

9. The system of claim 2, further comprising a naming subsystem, wherein said naming subsystem supports the creation of one or more named tags that can be associated with one or more element nodes or with individual fields within any given one of said element nodes without in any way modifying the defined structure or type of any value held in said any given one of said element nodes.

10. The system of claim 9, wherein said naming subsystem supports the creation of one or more named tags wherein said named tags may be text based, numeric, or of arbitrary type.

11. The system of claim 10, wherein said API includes support for said named tags created by said naming subsystem such that a collection contents stored on said one or more element nodes can be organized or searched using said named tags.

12. The system of claim 2 wherein the collections are linked into a single logical group thereby permitting transparent distributed querying and parallel access.

13. The system of claim 2, further comprising one or more global scripts, wherein said global scripts perform one or more named logical actions upon execution, including predefined system actions.

14. The system of claim 13, wherein said global scripts are capable of performing one or more actions on any of an element node or data field associated with any said element node.

15. The system of claim 14, wherein said global scripts may be inherited via any said element node or a type hierarchy.

16. The system of claim 15, further comprising one or more local scripts, wherein said local scripts are capable of overriding said one or more global scripts within a given process.

17. The system of claim 1, wherein said plurality of containers include one or more containers having a memory resident form.

18. The system of claim 1, wherein said plurality of containers include one or more containers having a file-based form.

19. The system of claim 1, wherein said plurality of containers include one or more containers having a server-based form.

20. The system of claim 1, wherein said one or more databases are created using a flat data model.

21. The system of claim 1, wherein said one or more data aggregation structures include structures having 'firstChild' and 'lastChild' links.

22. The system of claim 2, wherein said one or more data aggregation structures include support for types of data structures selected from the group consisting of: stacks, rings, multi-dimensional arrays, queues, sets, N-trees, B-trees, lists, and arbitrary mixtures of these types of data structures.

23. The system of claim 22, wherein said API includes support for searching and sorting each of said types of data structures supported by said one or more data aggregation structures.

24. The system of claim 1, wherein said one or more data attachment structures is identical to said one or more data aggregation structures.

25. The system of claim 1, wherein the system further includes a memory management system, wherein said memory management system is capable of storing one or more of said data aggregation structures in a memory that was previously used by identical data structures, thereby maximizing memory efficiency and reducing memory fragmentation.

26. The system of claim 1, wherein the system further comprises a change tracking system, wherein said change tracking system tracks changes to field values in order to facilitate automated access from and update to external storage repositories, such as conventional databases.

27. The system of claim 1, wherein the collections store associations between one or more arbitrary data bytes to one or more data structures within the collections.

28. The system of claim 27, wherein said arbitrary data bytes stored in the collections cannot be accessed from clients of the collections.

29. The system of claim 28, wherein said arbitrary data bytes stored in the collections store security tags for restricting access to all or some portion of the collections.

30. The system of claim 1, wherein the collections further include embedded type information directly within each of the collections.

31. The system of claim 1, further comprising one or more defined annotations.

32. The system of claim 31, wherein said defined annotations include one or more arbitrary system defined annotations.

33. The system of claim 31, wherein said defined annotations include one or more application defined annotations.

34. The system of claim 31, wherein said defined annotations are associated with a network node or data field associated with said network node.

35. The system of claim 31, wherein said defined annotations may be inherited via a type hierarchy.

* * * * *